United States Patent
Minami et al.

(10) Patent No.: US 8,140,727 B2
(45) Date of Patent: *Mar. 20, 2012

(54) BUS ARBITRATION APPARATUS AND METHOD

(75) Inventors: Toshiaki Minami, Yokohama (JP);
Shunichi Kaizu, Kawasaki (JP);
Yasunari Nagamatsu, Kawasaki (JP);
Daisuke Shiraishi, Tokyo (JP); Makoto Fujiwara, Inagi (JP); Koji Moriya, Yokohama (JP); Koichi Morishita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/112,938

(22) Filed: May 20, 2011

(65) Prior Publication Data

US 2011/0219156 A1    Sep. 8, 2011

Related U.S. Application Data

(63) Continuation of application No. 12/095,599, filed as application No. PCT/JP2007/061833 on Jun. 12, 2007, now Pat. No. 7,962,678.

(30) Foreign Application Priority Data

Jun. 15, 2006    (JP) ................................. 2006-166630

(51) Int. Cl.
*G06F 13/00*    (2006.01)

(52) U.S. Cl. ......................... 710/119; 710/110; 710/120

(58) Field of Classification Search .................. 710/110, 710/119, 120, 124, 125
See application file for complete search history.

(56) References Cited

U.S. PATENT DOCUMENTS

| | | | |
|---|---|---|---|
| 5,283,902 | A | 2/1994 | Dorn |
| 5,619,661 | A | 4/1997 | Crews et al. |
| 5,708,784 | A | 1/1998 | Yanai et al. |
| 5,710,891 | A | 1/1998 | Normoyle et al. |
| 5,933,610 | A | 8/1999 | Chambers et al. |
| 6,073,199 | A | 6/2000 | Cohen et al. |
| 6,347,351 | B1 | 2/2002 | Osborne et al. |
| 6,347,352 | B1 | 2/2002 | Jeddeloh et al. |
| 6,480,917 | B1 | 11/2002 | Moertl et al. |
| 6,826,643 | B2 | 11/2004 | Quan et al. |
| 7,962,678 | B2 * | 6/2011 | Minami et al. ................ 710/119 |
| 2003/0145144 | A1 | 7/2003 | Hofmann et al. |
| 2005/0066093 | A1 | 3/2005 | Fuchikami et al. |
| 2005/0255297 | A1 | 11/2005 | Otsuka et al. |

FOREIGN PATENT DOCUMENTS

| | | |
|---|---|---|
| JP | 6-90242 A | 3/1994 |
| JP | 10-289203 A | 10/1998 |
| JP | 2005-092780 A | 4/2005 |
| JP | 2005-314842 A | 11/2005 |

* cited by examiner

*Primary Examiner* — Glenn A Auve
(74) *Attorney, Agent, or Firm* — Fitzpatrick, Cella, Harper & Scinto

(57) ABSTRACT

A bus arbitration apparatus according to this invention appropriately arbitrates bus rights of use between a plurality of masters and a plurality of slaves so as to efficiently perform requested data transfer. An arbiter A 5 receives data transfer requests with respect to a slave A 3 generated by masters A 1 and B 2. The arbiter A 5 cooperates with an arbiter B 4, and arbitrates a contention of the data transfer requests with respect to the slave A 3 generated by the masters A 1 and B 2.

8 Claims, 15 Drawing Sheets if(Mpos1 − Qpos ≧ Param){Qcond1 = True}else{Qcond1 = false}
if(Mpos2 − Qpos ≧ Param){Qcond2 = True}else{Qcond2 = false}

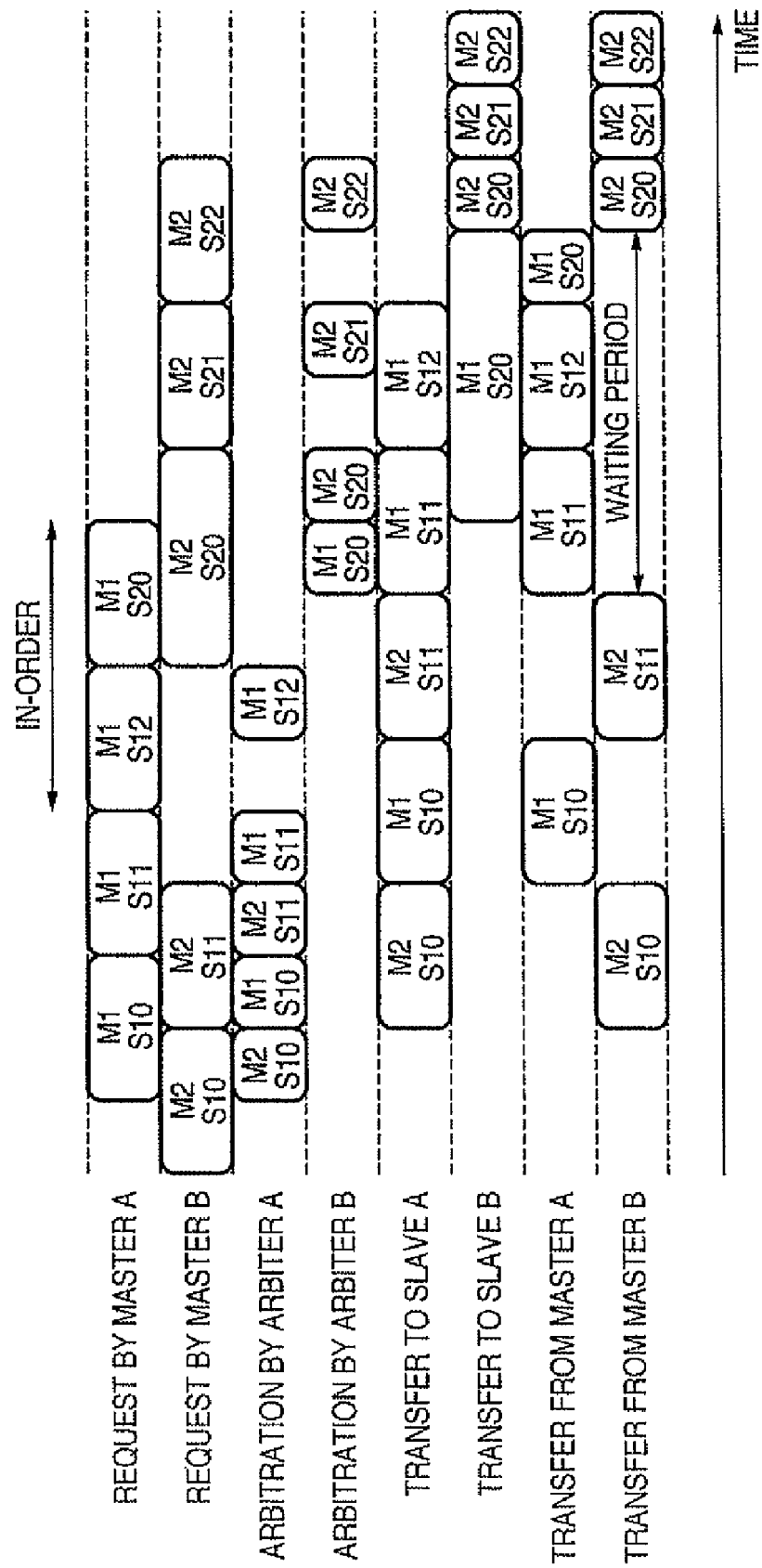

BUS ARBITRATION APPARATUS AND METHOD

This application is a continuation of U.S. application Ser. No. 12/095,599, which was the National Stage of International Application No. PCT/JP2007/061833, filed Jun. 12, 2007. The contents of each of the foregoing applications is incorporated herein by reference.

TECHNICAL FIELD

The present invention relates to a bus arbitration apparatus and method in a bus system which connects a plurality of masters and a plurality of slaves.

BACKGROUND ART

In recent years, the integration degree of system LSIs has remarkably increased. A demand has arisen for a bus configuration which allows a large number of masters to efficiently transfer data to a large number of slaves at high speed. Under these circumstances, multilayered bus systems for allowing a large number of masters to simultaneously transfer data to a large number of slaves are very popular.

As other problems to be considered in system LSIs, a master must finish the transfer of a requested data amount within the requested time. When the amount of data to be transferred is large with respect to the requested time, it becomes difficult to prevent deadline violation by this master. To the contrary, when the amount of data to be transferred is small with respect to the requested time, the master can readily meet its deadline.

For example, patent reference 1 (Japanese Patent Laid-Open No. 10-289203) describes a bus arbitration apparatus which preferentially assigns a bus to a device delayed from the reference. The bus arbitration apparatus in patent reference 1 (Japanese Patent Laid-Open No. 10-289203) comprises a reference counter operating with a clock based on the transfer rate each device is requested of and a transfer data counter for measuring an actually transferred data amount. At the time of bus arbitration, the arbitration apparatus compares the values of these two counters to perform bus arbitration.
Patent Reference 1: Japanese Patent Laid-Open No. 10-289203

DISCLOSURE OF INVENTION

Problems that the Invention is to Solve

As shown in FIG. 15, assume that master A requests data transfer to slave A in the order of M1S10, M1S11, and M1S12 and then data transfer of M1S20 to slave 2. Assume also that data transfer of M1S12 to slave A and data transfer of M1S20 to a slave 2 are done by in-order transfer (data transfer in which data must be transferred in the requested order). In the in-order transfer, data transfer before slave switching is referred to as "preceding data transfer"; and data transfer after slave switching, "succeeding data transfer". In the example shown in FIG. 15, data transfer of M1S10, M1S11, and M1S12 to slave A is the preceding data transfer, while data transfer of M1S20 to slave B is the succeeding data transfer.

Referring to FIG. 15, master B requests the data transfer to slave A in the order of M2S10 and M2S11 and to slave B in the order of M2S20, M2S21, and M2S22. In accordance with a predetermined algorithm, arbiter A which performs bus arbitration for slave A arbitrates data transfer requests to slave A. The predetermined algorithm is, for example, the round robin which alternately assigns the bus use right to masters A and B. In this scheme, arbiter A assigns the bus use right in the order of M2S10, M1S10, M2S11, M1S11, and M1S12. On the other hand, arbiter B which performs bus arbitration for slave B arbitrates data transfer requests to slave B. Arbiter B assigns the bus use right in the order of M1S20, M2S20, M2S21, and M2S22.

As a result of the above arbitration, data transfer to slave A is done in the order of M2S10, M1S10, M2S11, M1S11, and M1S12, and data transfer to slave B is done in the order of M1S20, M2S20, M2S21, and M2S22. The data transfer of M1S20 is succeeding data transfer by in-order transfer. The data transfer of M2S20, M2S21, and M2S22 requested by master B after M1S20 must wait until the end of in-order transfer although the data transfer requested by master B is executable.

That is, when one master sequentially sends data transfer requests to two different slaves and these two data transfer operations are done by in-order transfer, data transfer succeeding these two data transfer operations must wait until the end of the preceding data transfer. During the waiting period, a slave which performs succeeding data transfer cannot perform other data transfer, thus degrading processing efficiency.

We proposed a deadline scheduling arbiter capable of preventing deadline violation of data transfer by a master-slave pair (Japanese Patent Application No. 2005-314842).

The present invention has been made in consideration of the above problems and has as its object to appropriately arbitrate bus use rights between a plurality of masters and a plurality of slaves so as to efficiently perform the requested data transfer.

Means of Solving the Problems

In order to achieve the above object, a bus arbitration apparatus according to an aspect of the present invention has the following arrangement. That is, a bus arbitration apparatus which arbitrates a contention of data transfer to one of a plurality of slaves requested by a plurality of masters in a bus system in which the plurality of masters and the plurality of slaves are connected, comprises:

reception means for receiving data transfer requests to the one of the plurality of slaves from the plurality of masters; and arbitration means for cooperating with another bus arbitration apparatus which arbitrates a contention of data transfer to other slaves requested by the plurality of masters and arbitrating the contention of the data transfer to the one of the plurality of slaves requested by the plurality of masters.

In order to achieve the above object, a bus arbitration method according to another aspect of the present invention is a bus arbitration method which causes a bus arbitration apparatus corresponding to one of a plurality of slaves to arbitrate a contention of data transfer to the one of the plurality of slaves requested by a plurality of masters in a bus system in which the plurality of masters and the plurality of slaves are connected, comprising:

receiving data transfer requests to the one of the plurality of slaves from the plurality of masters; and cooperating with another bus arbitration apparatus which arbitrates a contention of data transfer to other slaves requested by the plurality of masters, and arbitrating the contention of the data transfer to the one of the plurality of slaves requested by the plurality of masters.

Effects of the Invention

According to the present invention, the bus right of use between a plurality of masters and a plurality of slaves can be appropriately arbitrated so as to efficiently perform the requested data transfer.

Other features and advantages of the present invention will be apparent from the following detailed description in conjunction with the accompanying drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 15 is a timing chart showing data transfer operation in a general bus system.

BEST MODE FOR CARRYING OUT THE INVENTION

Preferred embodiments of the present invention will be described in detail with reference to the accompanying drawings.

First Embodiment

A bus arbitration apparatus comprising a plurality of arbiters applied to a multilayered bus system capable of causing a plurality of masters to simultaneously transfer data to a plurality of slaves in an LSI system will be described below. While a given arbiter arbitrates data transfer from a given master to a given slave, the bus arbitration apparatus of this embodiment controls the arbitration operation of the data transfer by another arbiter in association of the arbitration operation of the given arbiter. In this manner, the arbitration operations between the plurality of arbiters influence each other to achieve efficient data transfer. The bus arbitration apparatus of the first embodiment will be described below.

Figure 1:
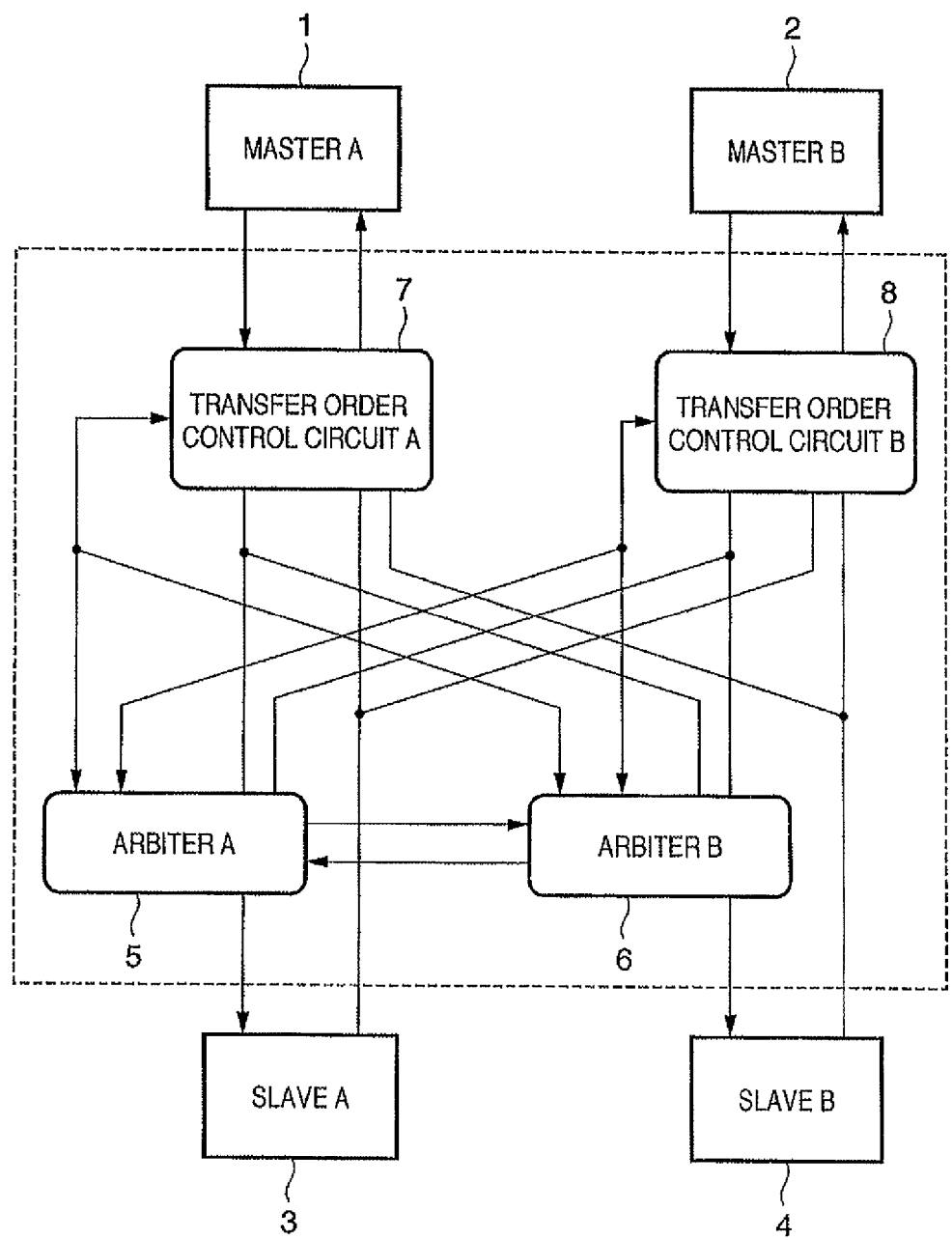
FIG. 1 is a block diagram showing an example of the arrangement of a multilayered bus system comprising two masters and two slaves according to the first embodiment.

FIG. 1 is a block diagram showing an example of the arrangement of a multilayered bus system comprising two masters and two slaves according to the first embodiment. Note that the first embodiment employs a simple arrangement including two masters and two slaves for descriptive convenience. The number of masters or the number of slaves is not limited to two in the present invention.

Referring to FIG. 1, a master A 1 and a master B 2 request data transfer. A slave A 3 and a slave B 4 execute data transfer operations with the masters in accordance with the requests from the master A 1 and the master B 2, respectively. An arbiter A 5 arbitrates the data transfer request from the master A 1 or the master B 2 to one slave A 3. An arbiter B 6 arbitrates the data transfer request from the master A 1 or the master B 2 to one slave B 4. A transfer order control circuit A 7 and a transfer order control circuit B 8 control the data transfer orders of the master A 1 and the master B 2, respectively. The transfer order control circuits A 7 and B 8 notify the arbiter A 5 or the arbiter B 6 that data transfer is possible when the masters A 1 and B 2 must transfer data in the requested transfer order (for example, in the case of in-order transfer). Each of the arbiters A 5 and B 6 performs arbitration to assign the bus right of use to the master A 1 or the master B 2 using information held by the other arbiter.

The arbiter A 5, the arbiter B 6, the transfer order control circuit A 7, and the transfer order control circuit B 8 constitute a bus arbitration apparatus which arbitrates the contention of the data transfer requested from a plurality of masters to one of a plurality of slaves in a bus system in which the plurality of masters and the plurality of slaves are connected. In this embodiment, the arbiter A 5 preferentially processes a request from the master B 2 over a request from the master A 1 when the number of transfer waiting requests from the master A 1 to the slave B 4 is large.

Figure 2:
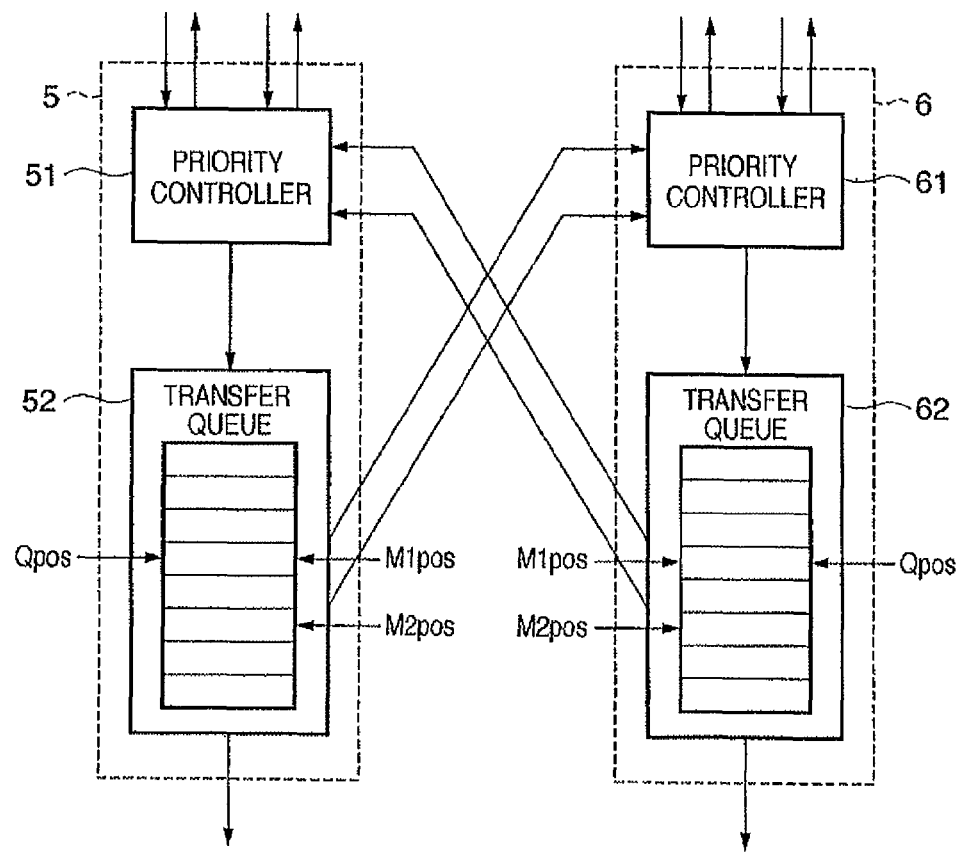
FIG. 2 is a block diagram showing an example of the arrangement of an arbiter according to the first embodiment.

FIG. 2 is a block diagram showing the detailed arrangement of the arbiter A 5 and the arbiter B 6. Note that an arrangement irrelevant to the description of the present invention is not illustrated. Priority controllers 51 and 61 determine one of the transfer operations from the masters A 1 and B 2 in accordance with handshake signals from the transfer order control circuits A 7 and B 8. The arbiters A 5 and B 6 receive from the transfer order control circuits A 7 and B 8 signals notifying that the current transfer operations are done by in-order transfer. Note that signals notifying that the transfer operations from the master A 1 and the master B 2 are done by in-order transfer are defined as inOrder1 and inOrder2, respectively.

The data transfer contents are transferred to transfer queues 52 and 62 in accordance with the bus rights of use arbitrated by the priority controllers 51 and 61, respectively. The transfer queue 52 gives the instruction for data transfer to the slave A 3 in the input data transfer order. Similarly, the transfer queue 62 gives the instruction for data transfer to the slave B 4 in the input data transfer order. Qpos, M1pos, and M2pos are signals representing the states of the transfer queues 52 and 62. Qpos represents the total number of data transfer operations stored in the transfer queue. For example, Qpos of the arbiter A 5 is incremented by one when the arbiter A 5 receives a transfer request from the priority controller 51 and is decremented by one when the arbiter A 5 sends a data transfer request to the slave A 3. Similarly, Qpos of the arbiter B 6 is incremented by one when the arbiter B 6 receives a transfer request from the priority controller 61 and is decremented by one when the arbiter B 6 sends a data transfer request to the slave B 4.

M1pos and M2pos are signals notifying other arbiters of the states of the transfer queues 52 and 62 and represent the numbers of data transfer operations for the respective masters in the transfer queues. For example, M1$pos$ in the arbiter A 5 represents the number of data transfer operations requested from the master A 1 and queued in the transfer queue 52. M2$pos$ represents the number of data transfer operations requested from the master B 2 and queued in the transfer queue 52. Other arbiters are notified of the numbers M1$pos$ and M2$pos$ of data transfer operations for the respective masters. More specifically, the priority controller 61 of the arbiter B 6 is notified of the states (M1$pos$ and M2$pos$) of the transfer queue 52 of the arbiter A 5. The priority controller 51 of the arbiter A 5 is notified of the states (M1$pos$ and M2$pos$) of the transfer queue 62 of the arbiter B 6.

The respective arbiters hold the externally notified numbers M1$pos$ and M2$pos$ of transfer queues as Mpos1 and Mpos2. Note that two arbiters are used in this embodiment, so the numbers of M1$pos$ and M2$pos$ are one each: M1$pos$=Mpos1 and M2$pos$=Mpos2. When three or more arbiters are present, the maximum values of externally notified the numbers M1$pos$ and M2$pos$ of data transfer operations for the respective masters are held as Mpos1 and Mpos2. Note that the sum of the externally notified numbers M1$pos$ of data transfer operations and the sum of the externally notified numbers M2$pos$ of data transfer operations are held as Mpos1 and Mpos2, respectively, and that these sums can be used for the following arbitration control.

Figure 3:
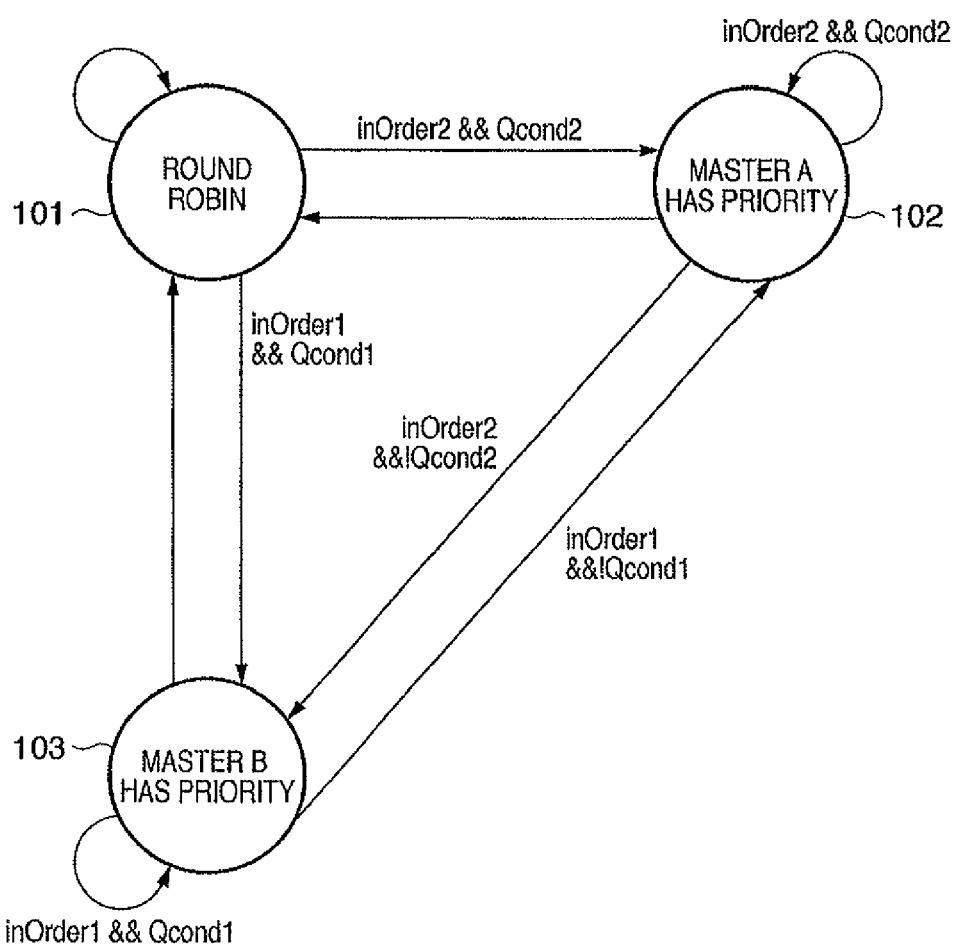
FIG. 3 is a transition chart for explaining the operation of a priority controller in the arbiter according to the first embodiment.

FIG. 3 is a state transition chart for explaining the operations of the priority controllers 51 and 61 shown in FIG. 2. A state 101 is a state in which priority control is performed by the round robin. In this case, the data transfer requests from the master A 1 and the master B 2 are alternately stored in the transfer queue 52. A state 102 is a state in which the data transfer request from the master A 1 has priority. In this case, the transfer request from the master A 1 is stored in the transfer queue 52 or 62 except when the master A 1 does not send a transfer request. A state 103 is a state in which the data transfer request from the master B 2 has priority. In this case, the transfer request from the master B 2 is stored in the transfer queue 52 or 62 except when the master B 2 does not send a transfer request.

Signals Qcond1 and Qcond2 representing the state transition conditions are generated as follows.

```
if(Mpos1 − Qpos ≧ Param){Qcond1 = True} else
{Qcond1 = False}        → Condition 1
if (Mpos2 − Qpos ≧ Param){Qcond2 = True} else
{Qcond2 = False}        → Condition 2
```

Note the constant Param is a predetermined value and can be changed in accordance with register control (not shown) of a microprocessor.

Qcond1 and Qcond2 represent that the difference between the number of preceding data transfer operations in the transfer waiting state and the number of succeeding data transfer operations in the transfer waiting state in in-order transfer is equal to or more than a predetermined value (Param). More specifically, according to these conditions, when the preceding data transfer waiting count is larger than the succeeding data transfer waiting count in in-order transfer, the succeeding data transfer waits the end of preceding data transfer. When this condition is satisfied, data transfer other than in-order transfer is preferentially performed, thus achieving efficient transfer. Therefore, the constant Param uses an optimal value determined in accordance with the capacity of the slave A 3 and the capacity of the slave B 4.

When inOrder2 is true (transfer from the master B 2 is done by in-order transfer) and Qcond2 is true, the state 101 transits to the state 102. When the following two conditions are satisfied, that is, when the transfer requested by the master B 2 is succeeding in-order transfer, and when the preceding in-order transfer of the master B 2 satisfies a predetermined condition (condition 2) among the transfer operations in the queue held by the other arbiter (the preceding data transfer waiting count is larger than the succeeding data transfer waiting count), control is performed to preferentially perform transfer from the master A 1. When this condition (condition 2) is satisfied, no transition from the state 102 to another state occurs.

When data transfer of the other arbiter progresses, and preceding in-order transfer no longer satisfies the above condition (condition 2), the state transits to the state 103 to preferentially perform succeeding in-order transfer requested by the master B 2. The process then returns to the round robin state 101.

When inOrder1 is true and Qcond1 is true in the state 101, the state 101 transits to the state 103. When the transfer requested by the master A 1 is succeeding in-order transfer and the preceding in-order transfer requested by the master A 1 satisfies a predetermined condition (condition 1) among the transfer operations in the queue held by the other arbiter, control is performed to preferentially perform transfer requested by the master B 2. As long as this condition is satisfied, the state 103 does not transit to another state.

When data transfer of the other arbiter progresses, and preceding in-order transfer no longer satisfies the above condition (condition 1), the state transits to the state 102 to preferentially perform succeeding in-order transfer requested by the master A 1. The process then returns to the round robin state 101.

More specifically, a case in which the above value Param is zero will be described below with reference to FIG. 4. When the succeeding data transfer waiting count is smaller than the preceding data transfer waiting count in arbitrating the succeeding in-order data transfer for Param=0, data transfer other than the succeeding data transfer is preferentially performed. This is to prevent the trouble experienced when succeeding data transfer completes data transfer preparation and is set in the preceding data transfer waiting state, so other transfer operations are undesirably kept in the waiting state.

Figure 4:
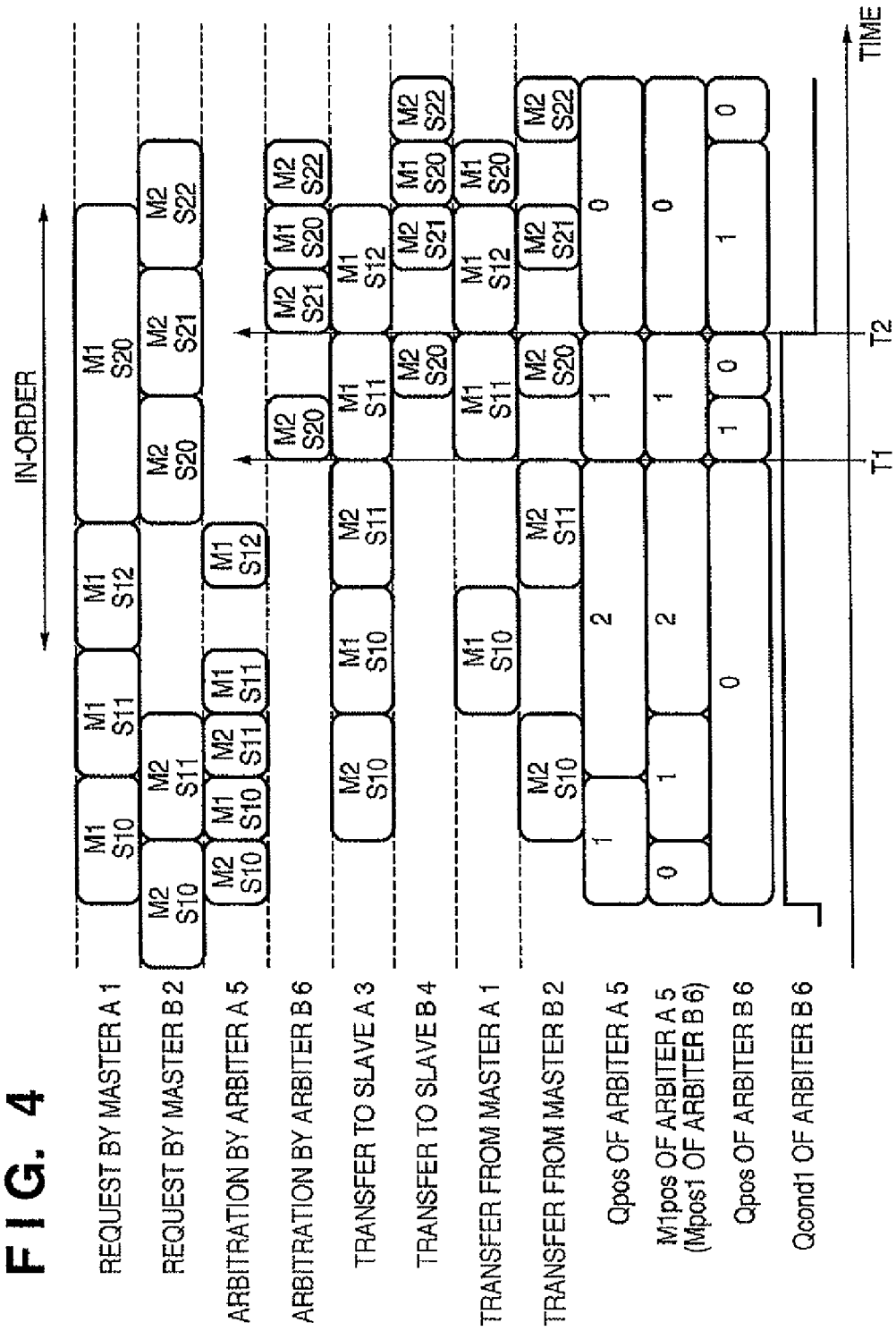
FIG. 4 is a timing chart showing an example of data transfer according to the first embodiment.

FIG. 4 is a timing chart showing a data transfer example in this embodiment. FIG. 4 exemplifies Param=0. Referring to FIG. 4, at times T1 and T2, [Mpos1 of arbiter B 6 (M1$pos$ of arbiter A 5)]−Qpos of arbiter B 6]≧0. Qcond1 in the arbiter B 6 becomes true. That is, at times T1 and T2, Qcond1 in the arbiter B 6 is true. For this reason, the arbiter B 6 preferentially performs data transfer (M2S10 at T1 and M2S21 at T2) by the master B 2 over succeeding in-order data transfer (M1S12) requested by the master A 1. The data transfer (M2S21, M2S21, and M2S22) is executed by the master B 2 without any influence of the succeeding in-order data transfer by the master A 1, thereby achieving efficient transfer.

As described above, according to the first embodiment, the contention of the data transfer operations to one of the plurality of slaves requested by the plurality of masters can be arbitrated with cooperation with other bus arbitration apparatuses. In this arbitration, the data transfer waiting statuses of other bus arbitration apparatuses are detected, and the contention of the data transfer operations is arbitrated in accordance with the data transfer waiting statuses of other bus arbitration apparatuses. More specifically, each arbiter according to the first embodiment adjusts, in in-order data transfer, the bus arbitration algorithm based on the number of preceding data transfer operations in the waiting state in the other arbiter and the number (Qpos) of data transfer operations in the waiting state in the self arbiter. When in-order data transfer is accepted based on the number of preceding data transfer operations in the waiting state in the other arbiter and the number of data transfer operations in the waiting state in the self arbiter, it determines whether the preceding data transfer end waiting state can be set. If so, the data transfer requested by the other master is preferentially performed over the succeeding data transfer by the in-order transfer (the state 101 transits to the state 102 or the state 103), thereby achieving efficient data transfer.

Second Embodiment

Figure 5:
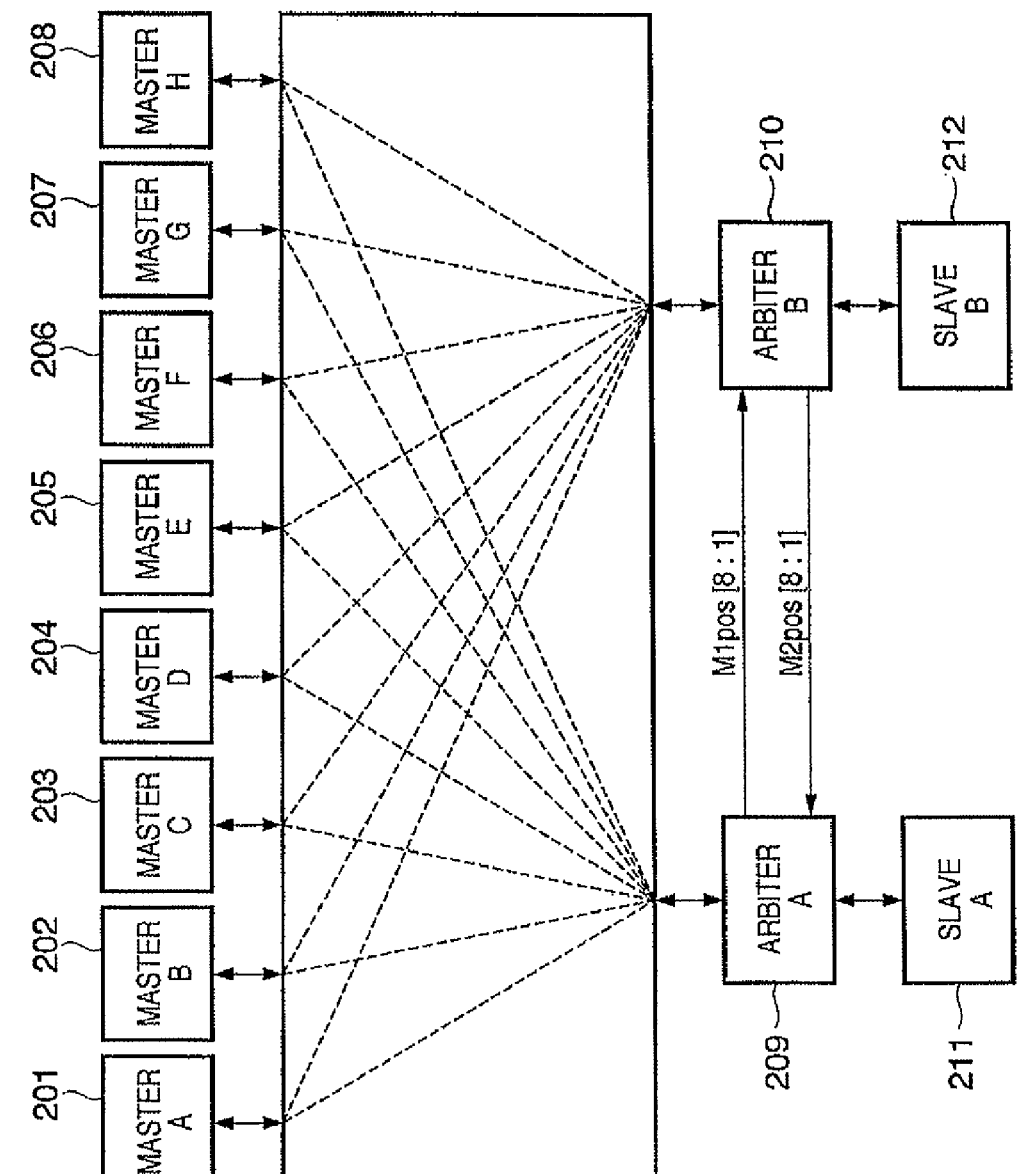
FIG. 5 is a block diagram showing an example of the arrangement of a multilayered bus system comprising eight masters and two slaves according to the second embodiment.

FIG. 5 is a block diagram showing an example of a multilayered bus system comprising eight masters A 201 to H 208 and two slaves A 211 and A 212 according to the second embodiment. Note that the number of masters and the number of slaves are not limited to them in the second embodiment of the present invention. The masters A 201 to H 208 request data transfer. The slave A 211 and the slave B 212 perform data transfer in response to the requests from the masters A 201 to H 208. An arbiter A 209 arbitrates one of the data transfer requests from the masters A 201 to H 208 by the round robin, and transfers the data to the slave A 211. An arbiter B 210 arbitrates one of the data transfer requests from the masters A 201 to H 208 by the round robin, and transfers the data to one slave B 212. Assume that the arbiter A 209 or the arbiter B 210 has the arrangement without any transfer queue so that each slave receives the arbitrated data transfer request. The arbiter A 209 notifies the arbiter B 210 of the bus right of use waiting counts M1$pos$[8:1] for respective masters held in the self arbiter. Similarly, the arbiter B 210 notifies the arbiter A 209 of the bus right of use waiting counts M2$pos$[8:1] for respective masters held in the self arbiter.

In this embodiment, an arbiter A 5 preferentially processes a request from a master B 2 over a request from a master A 1 when the number of transfer waiting requests from the master A 1 to a slave B 4 is large.

Figure 6:
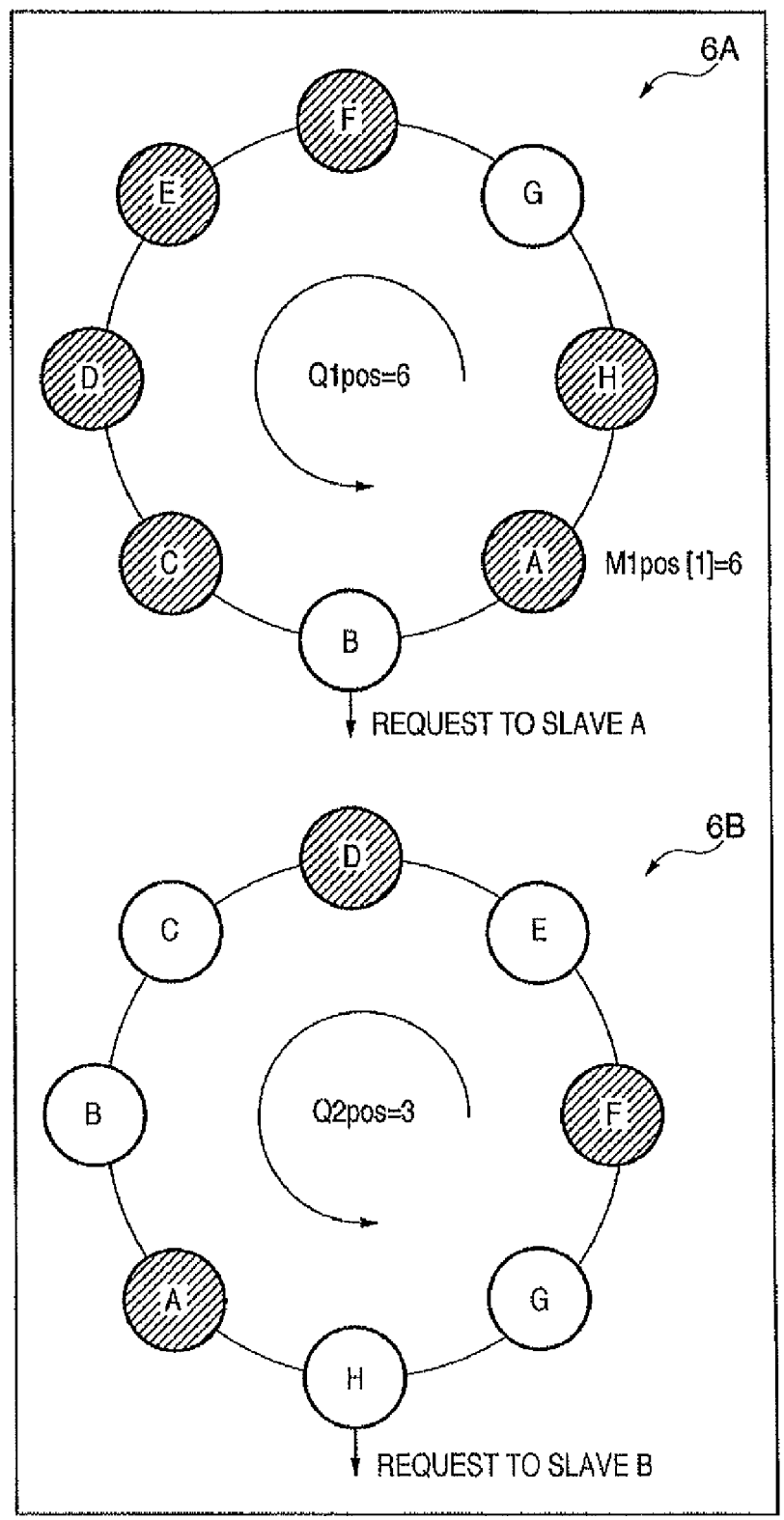
FIG. 6 is a view for explaining an arbitration operation by an arbiter according to the second embodiment.

FIG. 6 is a view for explaining arbitration operations by the arbiter A 209 and the arbiter B 210. Illustration in FIG. 6 will be described. Circles with letters A to H correspond to masters A to H. The masters in the white circles represent that they are not requesting data transfer. The masters in the hatched circles represent that they are requesting data transfer. A state of arbitration for the slave A 211 and a state of arbitration for the slave B 212 are shown in 6A and 6B of FIG. 6, respectively. The arbiter A 209 and the arbiter B 210 perform the arbitration in accordance with the round robin. The masters in FIG. 6 are rotated counterclockwise so that the master located in the bottom of the large circle requests data transfer to a slave. In the next arbitration, the masters are rotated until the master requesting data transfer comes to the bottom of the circle.

Each of the arbiter A 209 and the arbiter B 210 holds the bus right of use waiting counts for the data transfer requested by the masters A 201 to H 208. The waiting counts held in the arbiter A 209 are M1$pos$[8:1] and the waiting counts held in the arbiter B 210 are M2$pos$[8:1]. In the example 6A in FIG. 6, assume that the data transfer waiting counts held in the arbiter A 209 are M1$pos$[1]=6, M1$pos$[2]=0, M1$pos$[3]=1, M1$pos$[4]=2, M1$pos$[5]=3, M1$pos$[6]=4, M1$pos$[7]=0, and M1$pos$[8]=5. Assume also that the data transfer waiting counts held in the arbiter B 210 are M2$pos$[1]=1, M2$pos$[2]=0, M2$pos$[3]=0, M2$pos$[4]=2, M2$pos$[5]=0, M2$pos$[6]=3, M1$pos$[7]=0, and M1$pos$[8]=0. The total number Qpos of masters in a bus right of use waiting state is 6 (masters A, C, D, E, F, and H) for the arbiter A 209 or 3 (masters A, D, and F) for the arbiter B 210. Assume that Qpos of the arbiter A 209 is Q1$pos$ and that Qpos of the arbiter B 210 is Q2$pos$.

In this embodiment, the data transfer requested by the master A 201 is preceding in-order transfer to the slave A 211, and succeeding in-order transfer to the slave B 212. In accordance with the round robin, the master A 201 will be assigned the right of use next in the arbiter B 210. When, however, the relationship between Q2$pos$ held in the self arbiter and M1$pos$[1] held in the arbiter B 210 is as follows, the transfer by the master A 201 has lower priority.

$$M1pos[1]-Q2pos \geq Param$$

Figure 7:
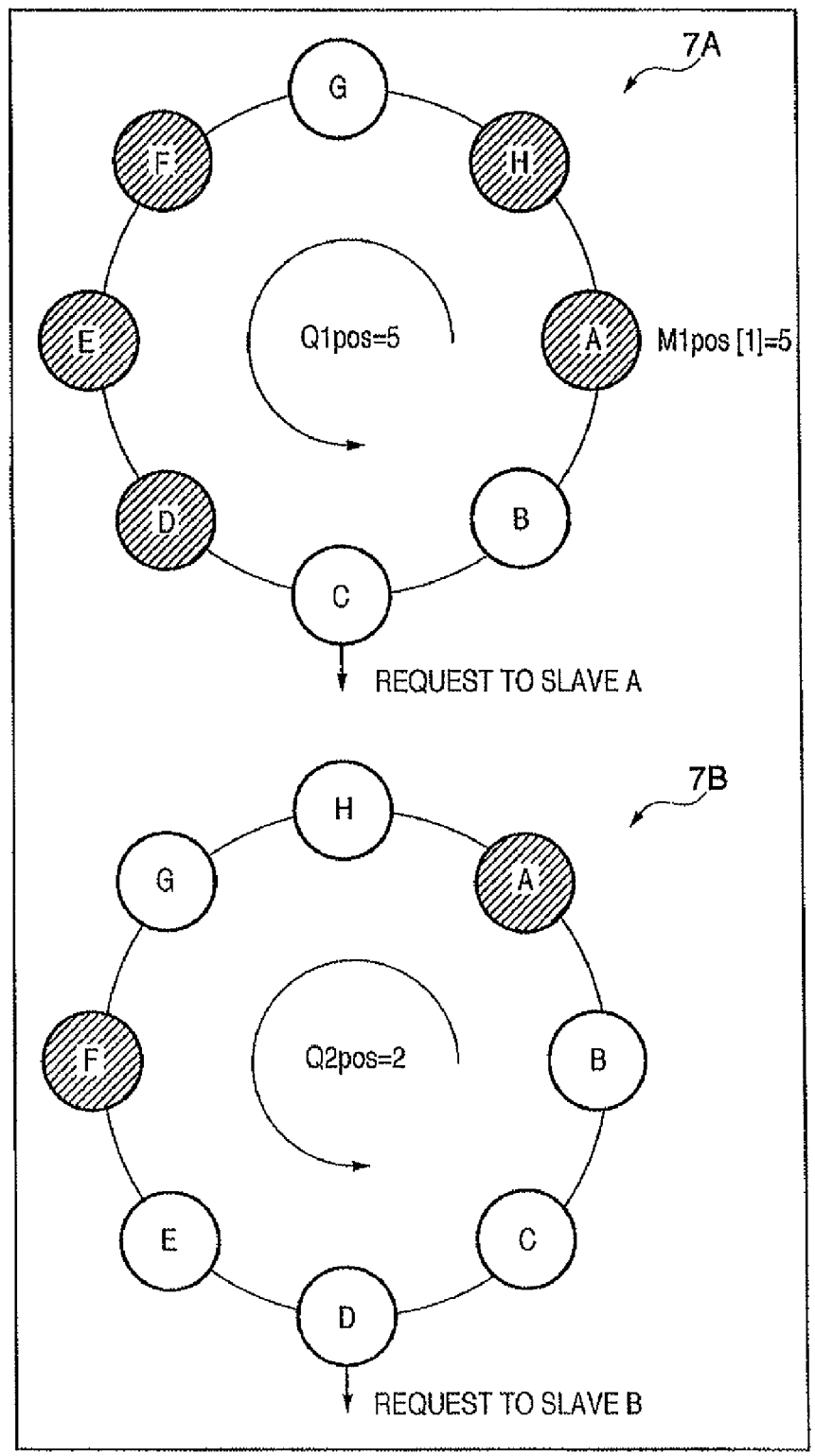
FIG. 7 is a view for explaining another arbitration operation by the arbiter according to the second embodiment.

In this embodiment, M1$pos$[1]=6 (the data transfer waiting count of the master A 201 held in the arbiter A 209 is 6) and Q2$pos$=3 (the total number of masters in the bus right of use waiting state, which is held in the arbiter B 210). If Param is equal to or smaller than 3, the transfer by the master A 201 has lower priority. FIG. 7 is a view showing a state in which the arbitration state in FIG. 6 transits to the next arbitration state when Param is equal to or smaller than 3. That is, the state shown in 6A of FIG. 6 transits to a state shown in 7A of FIG. 7 by determining the data transfer by the round robin. On the other hand, in the state shown in 6B of FIG. 6, the data transfer by the master A 201 is determined by the round robin. Since, however, M1$pos$[1]−Q2$pos$=6−3=3, the data transfer by the master A is skipped as shown in 7B of FIG. 7 and the data transfer by the master D has priority.

According to the second embodiment described above, it is possible to perform other data transfer operations regardless of whether preceding in-order data transfer is complete by not providing arbiters with transfer queues but holding bus right of use waiting counts for respective masters in arbiters, thereby achieving efficient data transfer.

Third Embodiment

Figure 8:
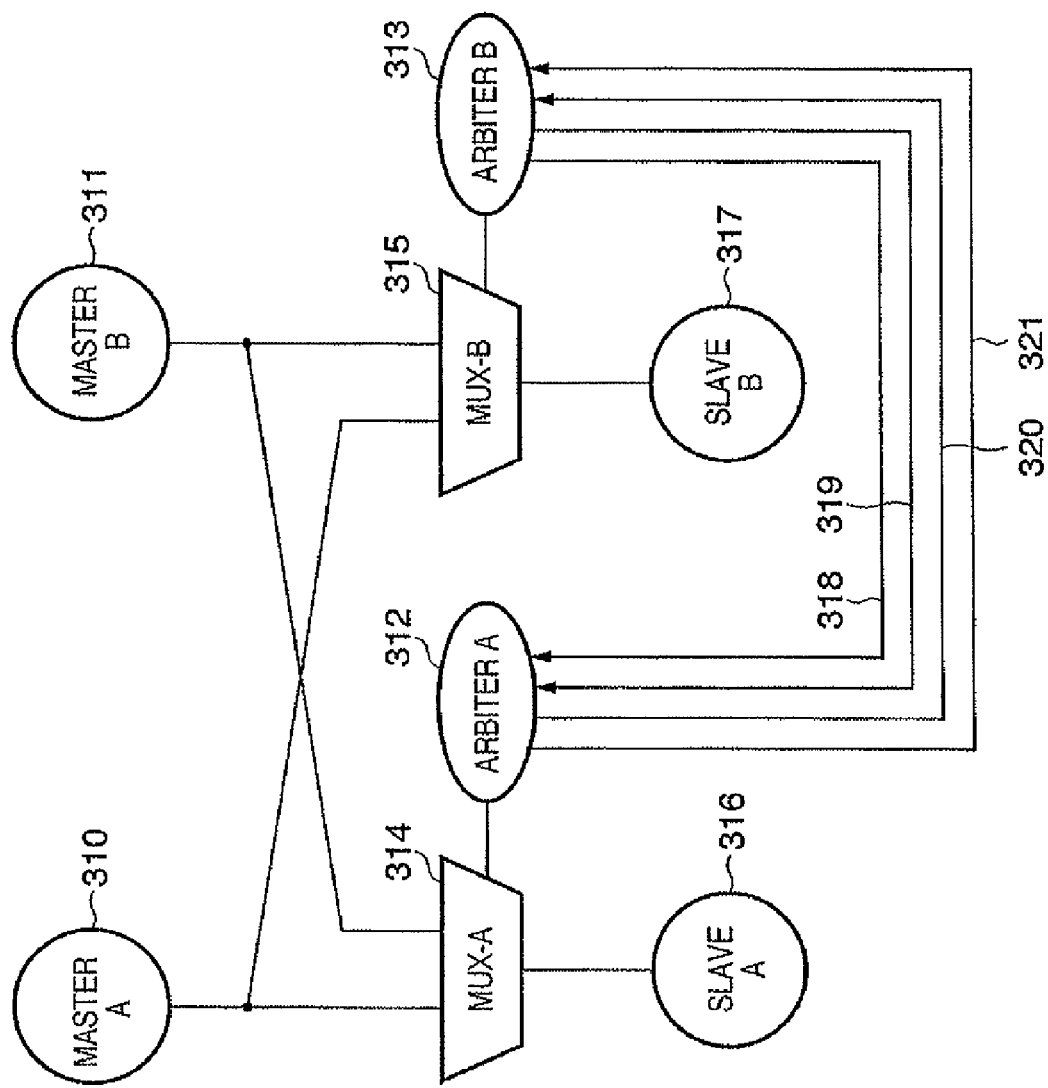
FIG. 8 is a diagram showing an example of the arrangement of a bus system according to the third embodiment.
Figure 9:
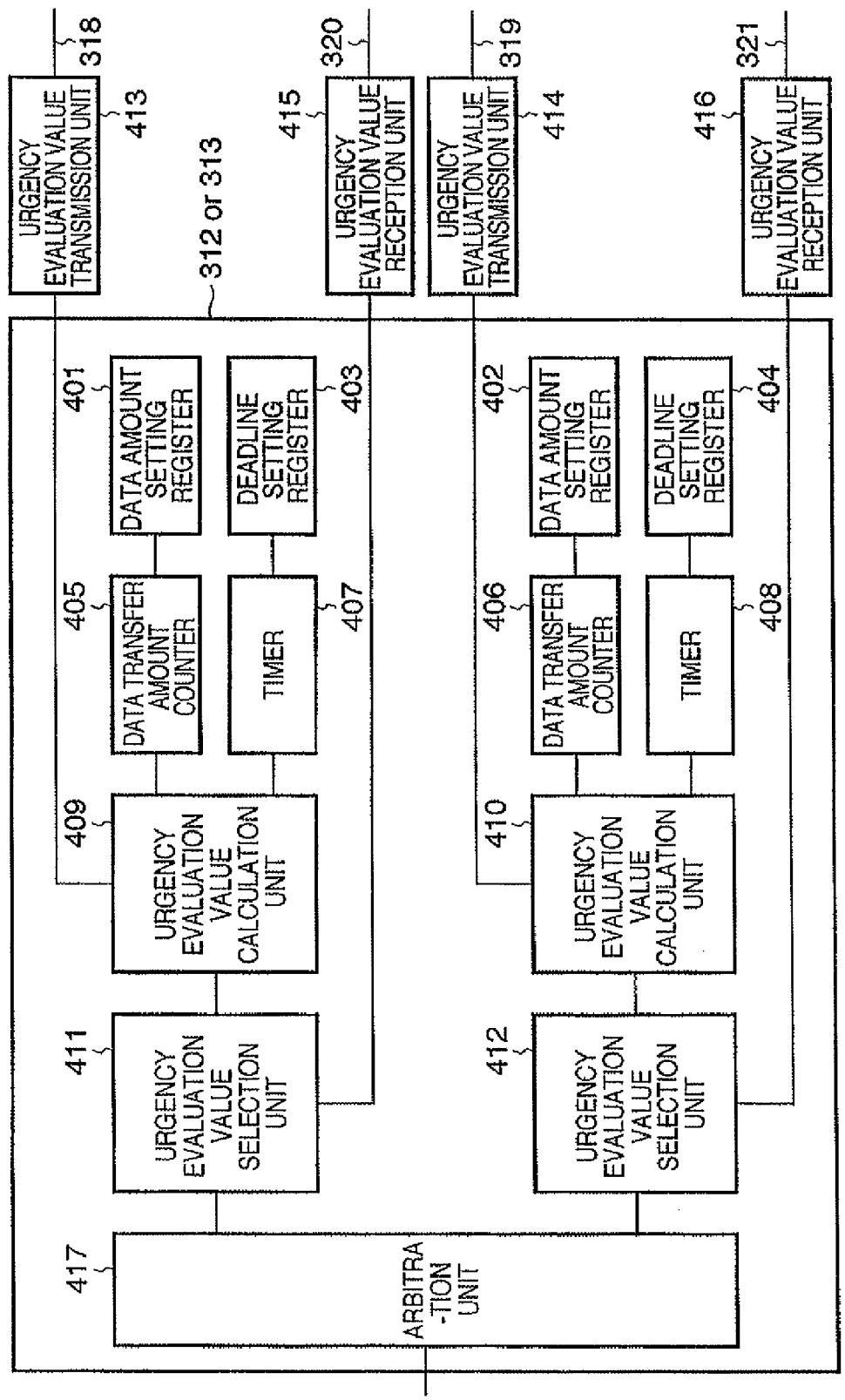
FIG. 9 is a block diagram showing an example of the arrangement of a deadline scheduling arbiter according to the third embodiment.

FIG. 8 is a diagram showing an example of the arrangement of a bus system according to the third embodiment. A bus arbitration apparatus according to the third embodiment comprises an arbiter A 312, an arbiter B 313, and a MUX-A 314 and MUX-B 315 as selectors. FIG. 9 is a block diagram showing an example of the arrangement of a deadline scheduling arbiter according to the third embodiment. The bus system according to the third embodiment comprises masters A 310 and B 311, deadline scheduling arbiters A 312 and B 313 (to be also referred to as the arbiter A 312 and the arbiter B 313), a MUX-A 314, a MUX-B 315, and slaves A 316 and B 317. Note that the number of masters and the number of slaves are not limited to those in the third embodiment of the present invention as in the first and second embodiments.

In the third embodiment, the arbiter A 312 uses the following criteria of urgency for arbitration:

a higher one of the urgency of data transfer between the master A 310 and the slave A 316 and the urgency of data transfer between the master A 310 and the slave B 317, and a higher one of the urgency of data transfer between the master B 311 and the slave A 316 and the urgency of data transfer between the master B 311 and the slave B 317.

Each of the masters A 310 and B 311 performs transfer with a deadline. Each of the arbiters A 312 and B 313 has the arrangement as shown in FIG. 9. A data transfer amount of the master A 310 (B 311) is set in a data amount setting register 401 (402). The data transfer time (i.e., the deadline) of the master A 310 (B 311) is set in a deadline setting register 403

(404). One of the masters A 310 and B 311, or CPU (not shown) makes initial settings of the registers 401 (402) and 403 (404).

A data transfer amount counter 405 (406) outputs an amount of data obtained by subtracting an amount of data having been transferred by each master from the value of the data amount setting register 401 (402). A timer 407 (408) outputs the remaining time obtained by starting counting down from the time stored in the deadline setting register 403 (404) upon reception of the first slave access request from the master A 310 (B 311).

An urgency evaluation value calculation unit 409 (410) calculates an urgency evaluation value by dividing the remaining amount of data output from the data transfer amount counter 405 (406) by the remaining time output from the timer 407 (408). An urgency evaluation value selection unit 411 (412) compares the urgency evaluation value calculated in the urgency evaluation value calculation unit 409 (410) with the urgency evaluation value of the master A 310 (B 311) received from the other arbiter. The urgency evaluation value selection unit 411 (412) selects the higher urgency, and notifies an arbitration unit 417 of it. The arbitration unit 417 compares the urgency evaluation values notified by the urgency evaluation value selection units 411 and 412 prepared for respective masters, and arbitrates to grant slave access to the master with a higher urgency.

An urgency evaluation value transmission unit 413 (414) transfers, to the other deadline scheduling arbiter, the urgency evaluation value of the master A 310 (B 311) output from the urgency evaluation value calculation unit 409 (410). Each of the urgency evaluation value reception unit 415 and 416 receives the urgency evaluation value of the master A 310 (B 311) transferred from the other deadline scheduling arbiter, and notifies the urgency evaluation value selection unit 411 (412) of it.

The MUX-A 314 and the MUX-B 315 are selectors, and grant slave access to the masters selected by the arbiters A 312 and B 313.

The operation in the third embodiment will be described next with reference to FIG. 10. A case in which the master B 311 transfers data to the slaves A 316 and B 317, the master A 310 transfers data to the slave A 316, and amounts of data d1, d2, and d3 and deadlines t1, t2, and t3 are set as shown in 10A and 10B of FIG. 10 will be explained.

The urgency evaluation value calculation unit 409 (410) of the deadline scheduling arbiter A 312 calculates an urgency evaluation value using the value of the data transfer amount counter 405 (406) and that of the timer 407 (408) during the data transfer by the corresponding master. As described above, the urgency evaluation value is calculated by dividing the value of the data transfer amount counter by the value of the timer. The urgency evaluation value calculation unit 409 (410) notifies the urgency evaluation value transmission unit 413 (414) and the urgency evaluation value selection unit 411 (412) of the calculated urgency evaluation value. The urgency evaluation value transmission unit 413 (414) transmits the urgency evaluation value of the master A 310 (B 311) to the other deadline scheduling arbiter B 313 via signal lines 318 to 321. The urgency evaluation value reception unit 415 (416) of the deadline scheduling arbiter A 312 notifies the urgency evaluation value selection unit 411 (412) of the urgency evaluation value of the master A 310 (B 311) transmitted from the other deadline scheduling arbiter B 313. The urgency evaluation value selection unit 411 selects the higher one of the notified two urgency evaluation values, and notifies the arbitration unit 417 of it. In the deadline scheduling arbiter B 313, the same operation is executed.

As described above, the deadline scheduling arbiter A 312 (B 313) in the third embodiment communicates the urgency evaluation value of the data transfer by the master to the other deadline scheduling arbiter B 313 (A 312) during the data transfer. The deadline scheduling arbiter A 312 (B 313) which has received the urgency evaluation value compares the urgency evaluation value received from the other deadline scheduling arbiter B 313 (A 312) with the urgency evaluation value held in the self arbiter, and performs arbitration using the higher urgency evaluation value.

Figure 10:
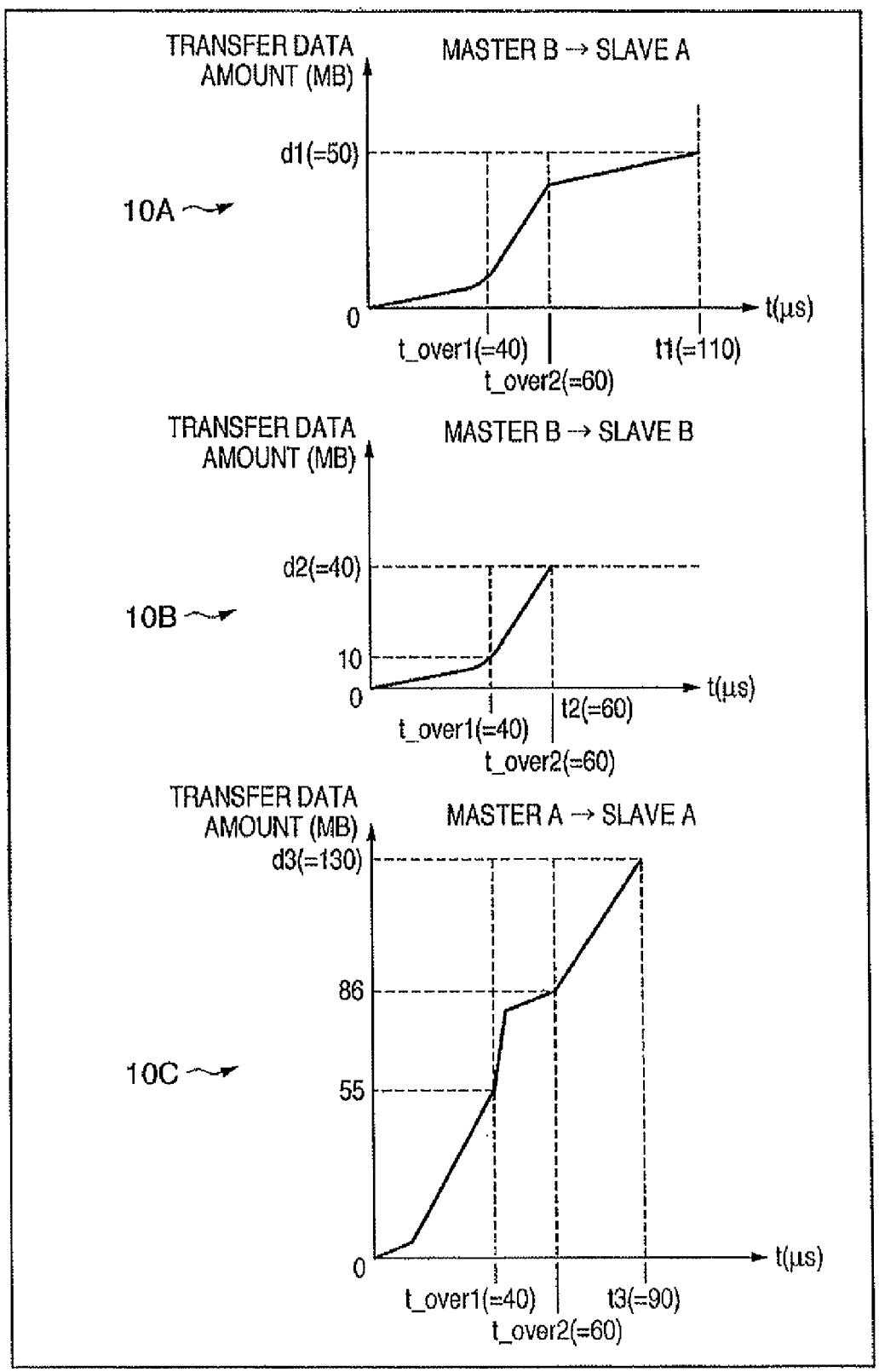
FIG. 10 is a view for explaining an example of data transfer operation according to the third embodiment.

In the example 10B in FIG. 10, the remaining amount of the data transfer from the master B 311 to the slave B 317 and the remaining time to the deadline at t_over1 (=40 μS) are 30 Mb and 20 μS, respectively. In this case, the urgency evaluation value is 1.5. According to an example 10C in FIG. 10, the remaining amount of the data transfer from the master A 310 to the slave A 316 and the remaining time to the deadline are 75 Mb and 50 μS, respectively. In this case, the urgency evaluation value is 1.5. After the time t_over1, the urgency evaluation value of the data transfer from the master B 311 to the slave B 317 exceeds the urgency evaluation value of the data transfer from the master A 310 to the slave A 316.

Note that arbitration of data transfer is performed upon completion of one transaction. At this time, data transfer from the master with a higher urgency always has priority. If, however, a data transfer request from the master with a higher urgency has not arrived at the time of arbitration, a data transfer request from the other master is selected. With this operation, a plurality of masters appear to perform data transfer operations for a certain period. In 10C of FIG. 10, after t_over1, the transfer rate from master A to slave A increases. This is because the data transfer rate from master A to slave A is high from the time of calculation of the urgency of the transfer from master B to slave A until the calculation result is reflected in the arbitration.

The urgency evaluation value transmission unit 414 transmits, to the deadline scheduling arbiter A 312, the urgency evaluation value of the master B 311 calculated in the urgency evaluation value calculation unit 410 of the deadline scheduling arbiter B 313. The urgency evaluation value reception unit 416 of the deadline scheduling arbiter A 312 notifies the urgency evaluation value selection unit 412 of the received urgency evaluation value of the master B 311. In this case, the urgency evaluation value selection unit 412 of the deadline scheduling arbiter A 312 is notified of the following urgency evaluation values:

the urgency evaluation value of the data transfer from the master B 311 to the slave A 316, which is calculated by the urgency evaluation value calculation unit 410 of the self arbiter, and the urgency evaluation value of the data transfer from the master B 311 to the slave B 317, which is transferred from the deadline scheduling arbiter B 313.

As described above, referring to FIG. 10, after the time t_over1, [the urgency evaluation value of the data transfer from the master B 311 to the slave A 316]<[the urgency evaluation value of the data transfer from the master B 311 to the slave B 317]. The urgency evaluation value selection unit 412 of the deadline scheduling arbiter A 312 therefore selects the urgency evaluation value of the transfer from the master B 311 to the slave B 317, and notifies the arbitration unit 417 of it. The arbitration unit 417 preferentially processes access from the master with a higher one of the notified urgency evaluation values, so that the arbitration unit 417 preferentially arbitrates access from the master B 311. Upon arbitration of access from the master B 311 to the slave A 316, buffer resources of the master B 311 are released. In this way, the master B 311 can issue an access request to the slave B 317, thus meeting the deadline t2 of the data transfer from the master B 311 to the slave B 317. At the time t_over2, the transfer from the master B 311 to the slave B 317 ends. At the time t_over2, the deadline scheduling arbiter A 312 then performs arbitration using the urgency evaluation value of the data transfer from the master B 311 to the slave A 316 as the urgency evaluation value of the master B 311.

As described above, according to the third embodiment, during data transfer from a given master to a given slave, the urgency evaluation value held in the bus arbitration apparatus arbitrating the data transfer and the urgency evaluation value held in the other deadline scheduling arbiter are compared. Even if one master simultaneously transfers data to a plurality of slaves, it is possible to reliably meet deadlines by performing arbitration using a larger urgency evaluation value.

Fourth Embodiment

Figure 11:
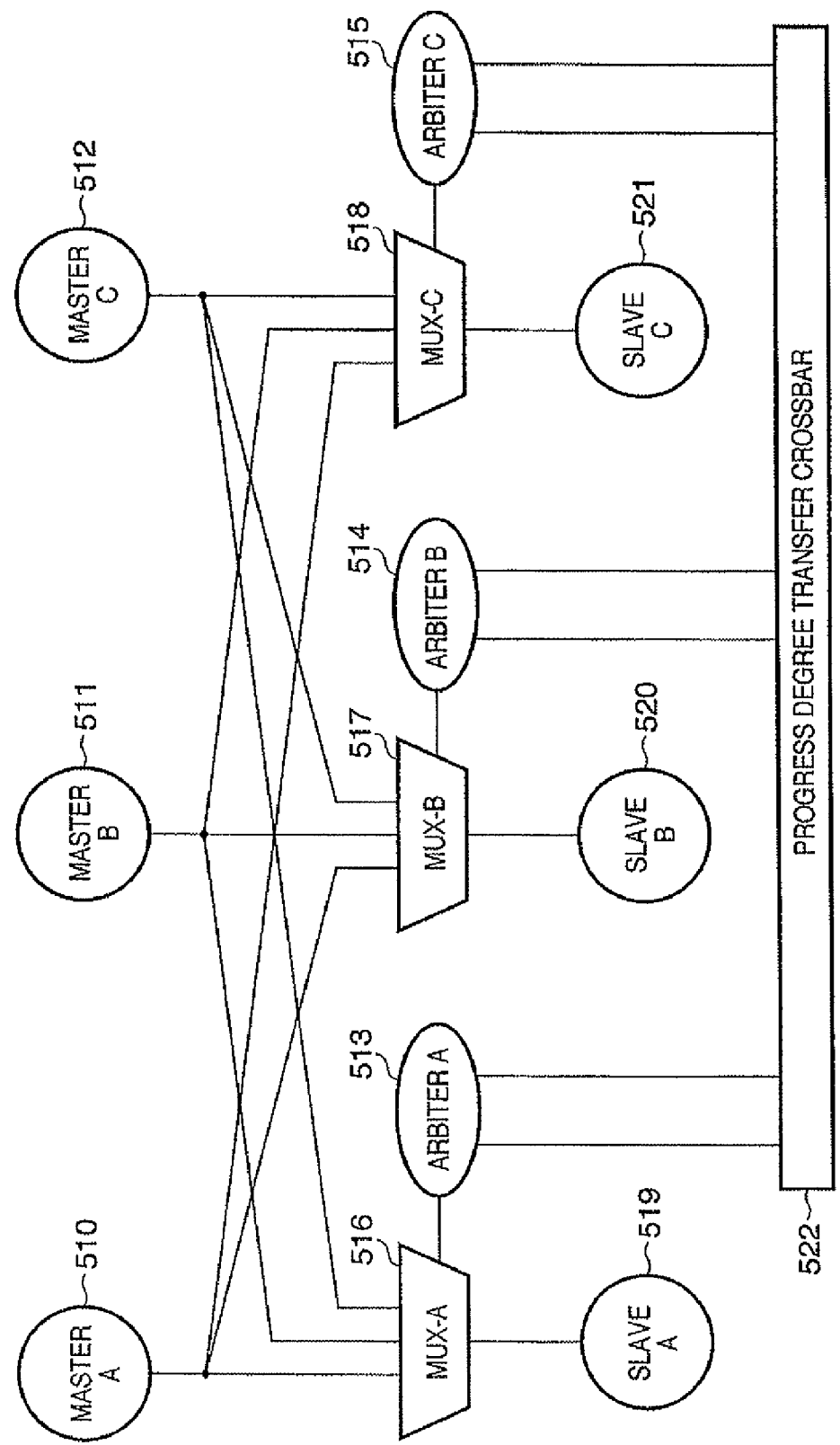
FIG. 11 is a diagram showing an example of the arrangement of a bus system according to the fourth embodiment.
Figure 12:
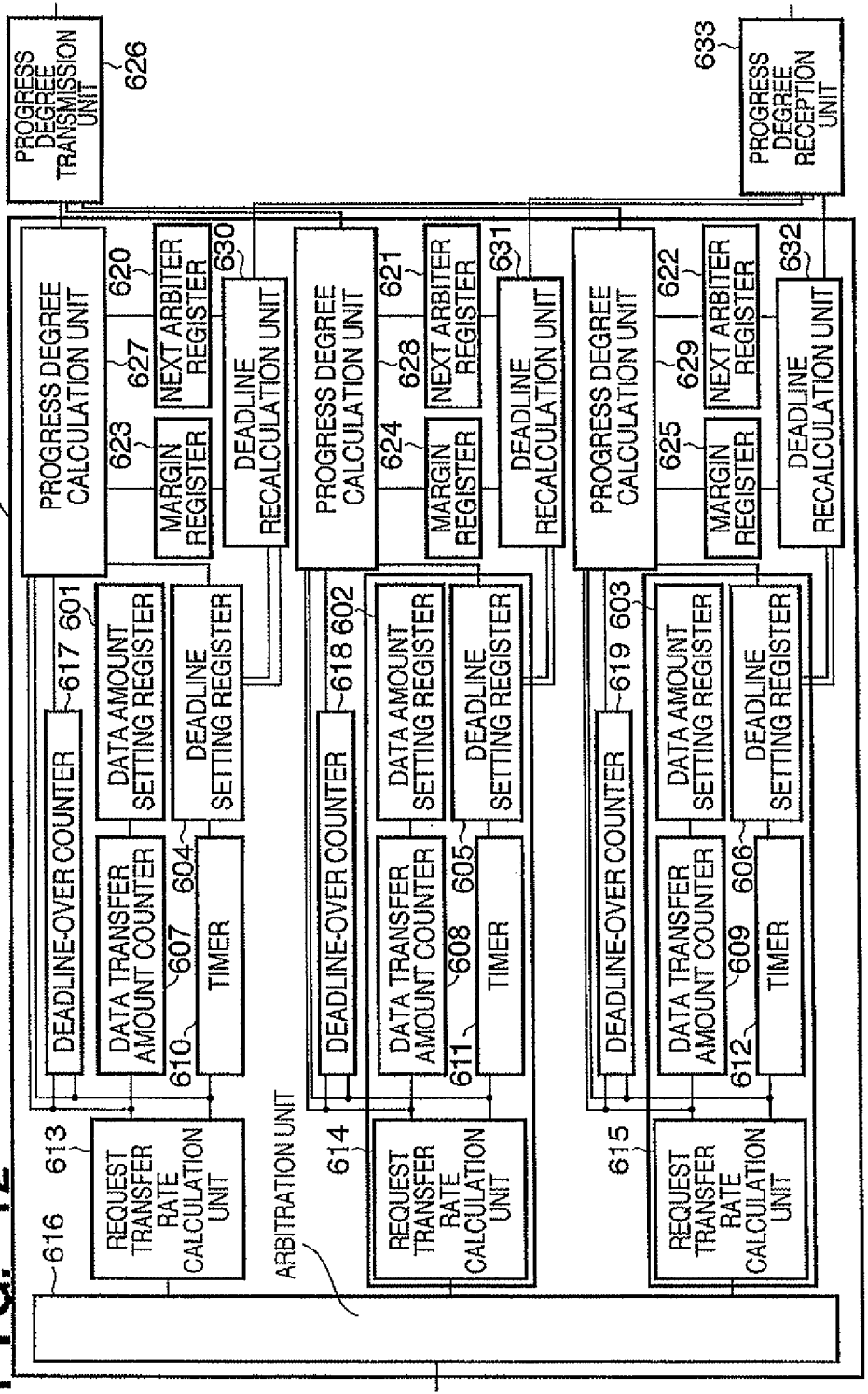
FIG. 12 is a block diagram showing an example of the arrangement of a deadline scheduling arbiter according to the fourth embodiment.

FIG. 11 is a diagram showing an example of a system arrangement according to the fourth embodiment. FIG. 12 is a block diagram showing an example of the arrangement of a deadline scheduling arbiter according to the fourth embodiment.

As shown in FIG. 11, the system according to the fourth embodiment comprises masters A 510 to C 512, deadline scheduling arbiters A 513 to C 515, a MUX-A 516, a MUX-B 517, a MUX-C 518, slaves A 519 to C 521, and a progress degree transfer crossbar 522. A bus arbitration apparatus according to the fourth embodiment comprises the arbiter A 513, the arbiter B 514, the arbiter C 515, the MUX-A 516, MUX-B 517, and MUX-C 518 as selectors, and the progress degree transfer crossbar 522. Each of the masters A 510 to C 512 performs transfer with a deadline. Each of the deadline scheduling arbiters A 513 to C 515 has the arrangement shown in FIG. 12.

In the fourth embodiment, if data transfer between a given master and a given slave is not completed by a deadline, the expiration time after the deadline is adjusted in data transfer between the given master and the next slave. If the data transfer is completed before the deadline, the remaining time until the deadline is allocated to the data transfer between the given master and the next slave.

Referring to FIG. 12, a data transfer amount of the master A 510 (B 511, C 512) is set in a corresponding data amount setting register 601 (602, 603). A time (deadline) for data transfer is set in a deadline setting register 604 (605, 606). A data transfer amount counter 607 (608, 609) outputs the remaining amount of data obtained by subtracting an amount of data having been transferred by each master from the value of the data amount setting register. A timer 610 (611, 612) outputs the remaining time obtained by starting counting down from the time stored in the deadline setting register 604 (605, 606) upon reception of the first slave access request from the master A 510 (B 511, C 512).

A request transfer rate calculation unit 613 (614, 615) calculates a request transfer rate by dividing the remaining amount of data output from the data transfer amount counter 607 (608, 609) by the remaining time output from the timer 610 (611, 612). An arbitration unit 616 compares the request transfer rates calculated in the request transfer rate calculation units 613 to 615, and preferentially arbitrates the master with a highest request transfer rate. When the timer 610 (611, 612) becomes zero, and the data transfer amount counter 607 (608, 609) is not zero, a deadline-over counter 617 (618, 619) measures the time until the data transfer amount counter 607 (608, 609) becomes zero. That is, the deadline-over counter 617 (618, 619) measures the time after the deadline of each data transfer operation expires. A next arbiter register 620 (621, 622) holds arbiter identification information representing a deadline scheduling arbiter in which the next transfer of the master A 510 (B 511, C 512) is performed.

A margin register 623 (624, 625) stores the remaining time to the deadline, which is obtained when the master A 510 (B 511, C 512) performs the data transfer.

One of the masters A 510, B 511 and C 512, or CPU (not shown) makes initial settings of the registers 601 (602, 603), 604 (605, 606), and 620 (621, 622).

When the data transfer amount counter 607 (608, 609) becomes zero earlier than the timer 610 (611, 612), a progress degree calculation unit 627 (628, 629) performs the following operation. That is, the progress degree calculation unit 627 (628, 629) calculates the sum of the value of the timer 610 (611, 612) and that of the margin register 623 (624, 625). The progress degree calculation unit 627 (628, 629) then notifies a progress degree transmission unit 626 of the calculated sum as the progress degree together with master identification information of the master which is currently performing the transfer.

When the timer 610 (611, 612) becomes zero earlier than the data transfer amount counter 607 (608, 609), the progress degree calculation unit 627 (628, 629) performs the following operation. First, the progress degree calculation unit 627 (628, 629) waits until the data transfer amount counter 607 (608, 609) becomes zero. Next, the progress degree calculation unit 627 (628, 629) calculates the difference between the values of the margin register 623 (624, 625) and the deadline-over counter 617 (618, 619). The progress degree calculation unit 627 (628, 629) then notifies the progress degree transmission unit 626 of the calculated difference as the progress degree together with master identification information of the master which is currently performing the transfer.

Upon reception of the notification of the degrees of progress and the master identification information from the progress degree calculation units 627 to 629, the progress degree transmission unit 626 transmits the degrees of progress to the progress degree transfer crossbar 522. A progress degree reception unit 633 receives the degrees of progress from the progress degree transfer crossbar 522, and distributes the received degrees of progress to deadline recalculation units 630 to 632 in accordance with the master identification information received with the degrees of progress.

When the next arbiter number is set in the next arbiter register 620 (621, 622), and when the degree of progress distributed from the progress degree reception unit 633 is equal to or larger than zero, the deadline recalculation unit 630 (631, 632) stores the degree of progress in the margin register 623 (624, 625).

Even if the degree of progress is equal to or larger than zero, when the next arbiter is not designated in the next arbiter register 620 (621, 622), the deadline recalculation unit 630 (631, 632) stores, in the deadline setting register 604 (605, 606), the sum of the received degree of progress and the value set in the deadline setting register. If the degree of progress is negative, the deadline recalculation unit 630 (631, 632) stores, in the deadline setting register 604 (605, 606), the sum of the received degree of progress and the value set in the deadline setting register.

The MUX-A 516, MUX-B 517, and MUX-C 518 are selectors, and allow slave access from the masters selected by the deadline scheduling arbiters A 513, B 514, and C 515 (to be also referred to as the arbiters A 513, B 514, and C 515). As shown in the example of FIG. 11, the arbiter A 513 is connected to the arbiters A 513, B 514, and C 515. The arbiter A 513 therefore can communicate with itself and the remaining arbiters. In this manner, since each arbiter is connected to all the arbiters including itself, the size of the progress degree transfer crossbar 522 is [the number of deadline scheduling arbiters]×[the number of deadline scheduling arbiters]. In this embodiment, the size is 3×3. Each of the deadline scheduling arbiters A 513, B 514, and C 515 transfers the degree of progress output from the corresponding progress degree transmission unit 626 based on the arbiter number designated by the progress degree transmission unit 626. Note that each arbiter need not use the progress degree transfer crossbar 522 for communication with itself. In this case, the size is [the number of deadline scheduling arbiters]×[the number of deadline scheduling arbiters−1].

The first operation example in the fourth embodiment will be described next with reference to FIG. 13. The first operation example is a case in which the master B 511 sequentially transfers the data to the slave A 519, the slave B 520, and the slave C 521 and the data transfer to the slave A 519 is not completed within a deadline.

A deadline T is set for the sequence of transfer operations performed by the master B 511 to the slaves A 519 to C 521. Each of the arbiters A 513, B 514, and C 515 is set in the initial state shown in 13A of FIG. 13. That is, the arbiters A 513, B 514, and C 515 are set so that an amount of data transfer d1 can be transferred to the slave A 519 by a deadline t1, an amount of data transfer d2 can be transferred to the slave B 520 by a deadline t2, and an amount of data transfer d3 can be transferred to the slave C 521 by a deadline t3, respectively. The deadline T is set to be [t1+t2+t3=T]. In the next arbiter register 621 of the arbiter A 513, which corresponds to the master B 511, "2" (representing arbiter B) is set. In the next arbiter register 621 of the arbiter B 514, "3" (representing arbiter C) is set. Furthermore, in the next arbiter register 621 of the arbiter C 515, "0×F" representing the final transfer is set.

The master B 511 transfers data to the slave A 519 first. The arbiter A 513 arbitrates the data transfer to the slave A 519. The operation of the arbiter A 513 will be described first.

Assume that since data transfer from another master to the slave A 519 has priority, the data transfer from the master B 511 to the slave A 519 is not completed before the deadline t1 set in the deadline setting register 605. At the time t1, when the value of the timer 611 becomes zero, the deadline-over counter 618 starts counting the expiration time. The progress degree calculation unit 628 monitors which of the data transfer amount counter 608 and the timer 611 becomes zero first. Since the timer 611 becomes zero at the time t1, the progress degree calculation unit 628 waits until the data transfer amount counter 608 becomes zero.

Figure 13:
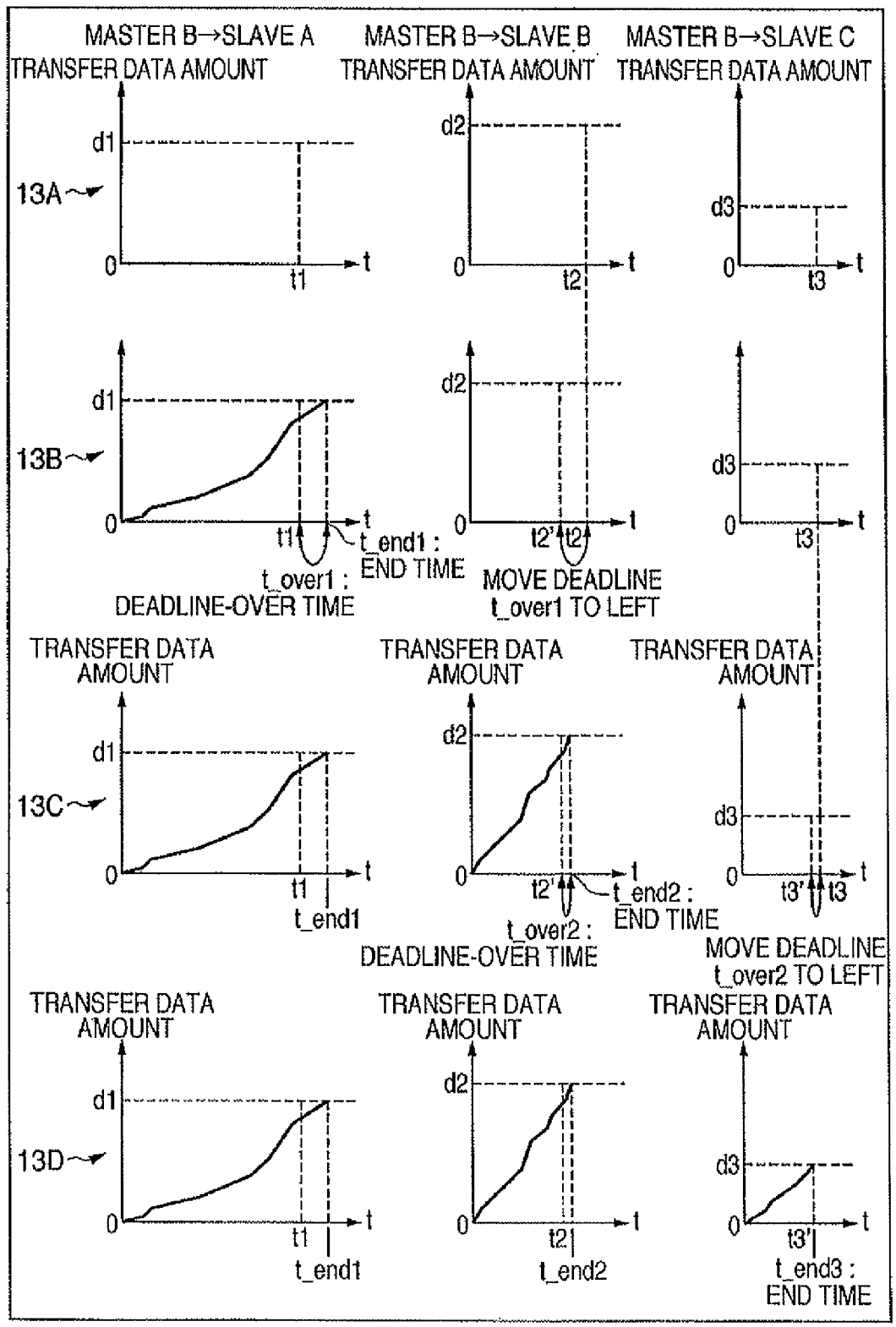
FIG. 13 is a view showing an operation example of data transfer according to the fourth embodiment.

As shown in 13B in FIG. 13, the data transfer amount counter 608 becomes zero (the data transfer from the master B 511 to the slave A 519 is complete) at the time t_end1. When the data transfer amount counter 608 becomes zero, the progress degree calculation unit 628 obtains a deadline-over time t_over1 from the deadline-over counter 618. Since the data transfer from the master B 511 to the slave A 519 is the first one of the sequence of data transfer operations, the margin register 624 is zero. The progress degree calculation unit 628 calculates [the value of the margin register 624]−[the deadline-over time] and obtains −t_over1 as a result of the calculation. The progress degree calculation unit 628 notifies the progress degree transmission unit 626 of the calculation result as the progress degree together with the arbiter identification information (=arbiter B) set in the next arbiter register 620 and the master identification information (master B) managed by the progress degree calculation unit 628 itself.

The progress degree transmission unit 626 transmits, to the progress degree transfer crossbar 522, the information notified by the progress degree calculation unit 628. The progress degree transfer crossbar 522 routes the received information to the progress degree reception unit 633 of the arbiter B 514 indicated by the arbiter identification information as part of the received information.

As a result of the routing, the data transfer from the master B 511 to the slave B 520 starts by arbitration of the arbiter B 514. The operation of the arbiter B 514 will be described below.

The progress degree reception unit 633 receives the degree of progress (−t_over1 in this case) and the master identification information (representing the master B 511) from the progress degree transfer crossbar 522. The progress degree reception unit 633 sends the degree of progress to the deadline recalculation unit corresponding to the received master identification information. In this case, the progress degree reception unit 633 sends the degree of progress to the deadline recalculation unit 631 corresponding to the master B 511. The deadline recalculation unit 631 determines whether the notified degree of progress is larger than zero. Since t_over1 is negative, the deadline recalculation unit 631 calculates the sum of −t_over1 and t2 set in the deadline setting register 606, and updates the value of the deadline setting register 606 with the calculation result. Consequently, the setting value of the deadline setting register 606 changes from t2 to t2'(=t2−t_over1). The result of the processing to this point is shown in 13B of FIG. 13.

The master B 511 then transfers data to the slave B 520 next. The arbiter B 514 arbitrates the data transfer to the slave B 520. Assume that since data transfer from another master to the slave B 520 interferes with the data transfer from the master B 511 to the slave B 520, the data transfer of the master B 511 is not completed within the deadline t2' set in the deadline setting register 605, and is complete at t_end2. The operation after that is the same as that of the data transfer from the master B 511 to the slave A 519. When the data transfer from the master B 511 to the slave B 520 is complete, the value of the deadline setting register 605 of the deadline scheduling arbiter C 515 is updated with t3−t_over2 (=t3'). The result of the processing to this point is shown in 13C of FIG. 13.

Finally, the master B 511 transfers data to the slave C 521. The arbiter C 515 arbitrates the data transfer to the slave C 521. If the data transfer to the slave C 521 is completed by the above deadline t3' set in the deadline setting register 605, the sequence of transfer operations from the master B 511 to the slaves A 519 to C 521 is completed within the deadline T. The result of the processing to this point is shown in 13D of FIG. 13.

As described above, it is possible to meet the deadline for the sequence of data transfer operations by checking the progress degree of the sequence of data transfer operations, and changing the deadline of each data transfer operation.

Figure 14:
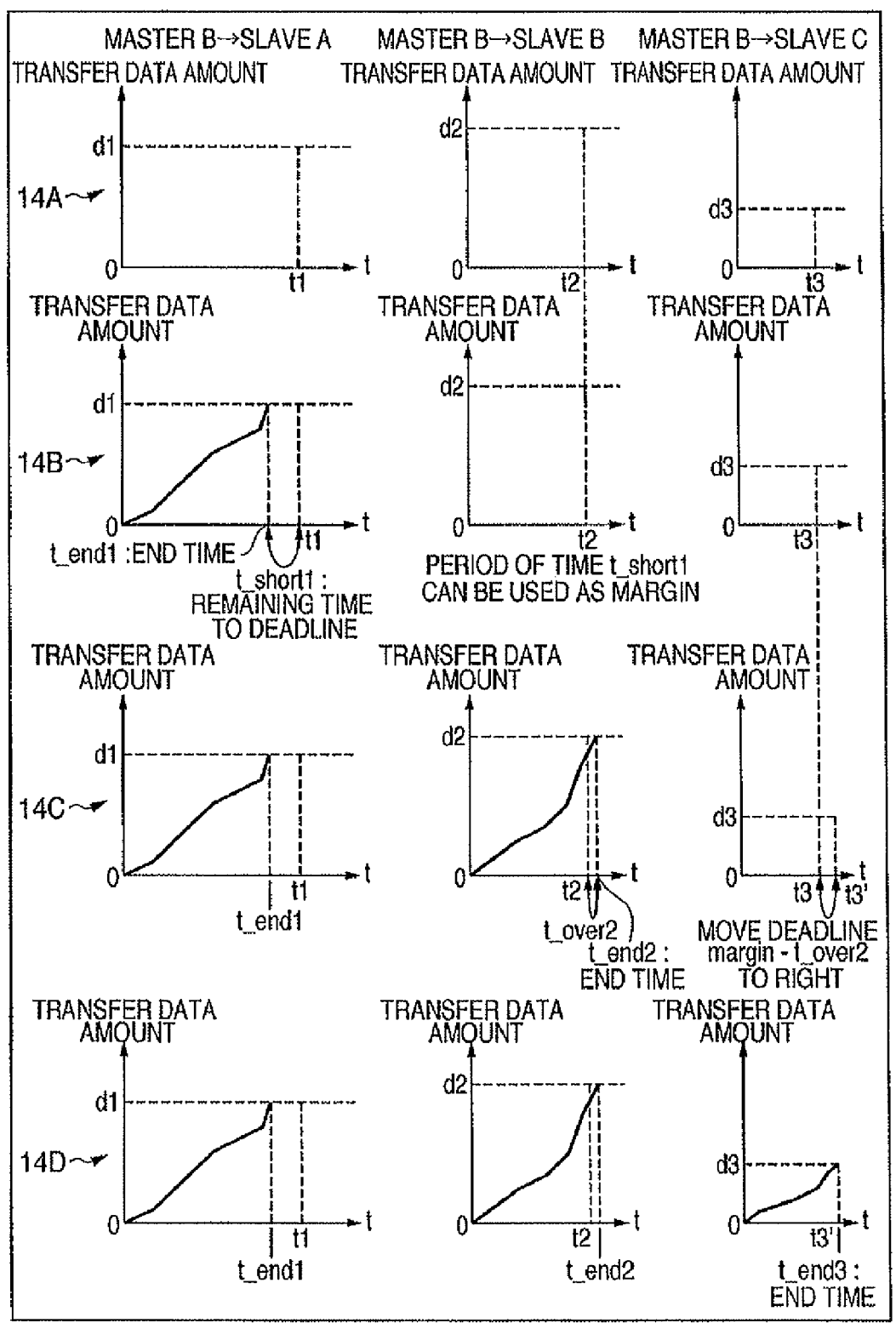
FIG. 14 is a view showing another operation example of data transfer according to the fourth embodiment.

The second operation example in the fourth embodiment will be described with reference to FIG. 14. The second operation example is a case in which the master B 511 sequentially transfers the data to the slave A 519, the slave B 520, and the slave C 521 and each data transfer operation is completed within the deadline with a time margin.

A deadline T is set for the sequence of data transfer operations performed by the master B 511. The arbiters A 513, B 514, and C 515 are set in the initial state shown in 14A of FIG. 14. This initial state is the same as that shown in 13A of FIG. 13.

The master B 511 transfers data to the slave A 519 first. The arbiter A 513 arbitrates the data transfer to the slave A 519. The operation of the arbiter A 513 will be described first.

Assume that during the data transfer from the master B 511 to the slave A 519, data transfer from another master to the slave A 519 is not performed.

Assume also that the data transfer from the master B 511 to the slave A 519 ends t_short1 before the deadline t1 set in the deadline setting register 605. The progress degree calculation unit 628 monitors which of the data transfer amount counter 608 and the timer 611 becomes zero first. If the data transfer amount counter 608 becomes zero earlier than the timer 611 at the time t_end1, the value of the timer 611 is obtained. Since the transfer operation from the master B 511 to the slave A 519 is the first one, the value of the margin register 624 is zero. The progress degree calculation unit 628 calculates [the value of the margin register 624]+[the value of the timer 611] and obtains t_short1 as a result of the calculation. The progress degree calculation unit 628 notifies the progress degree transmission unit 626 of the calculation result as the degree of progress together with the arbiter identification information (=arbiter B) and the master identification information (=master B) managed by the progress degree calculation unit 628 itself. The progress degree transmission unit 626 transmits, to the progress degree transfer crossbar 522, the information notified by the progress degree calculation unit 628. The progress degree transfer crossbar 522 routes the received information to the progress degree reception unit 633 of the arbiter B 514 indicated by the arbiter identification information as part of the received information.

As a result of the routing, the data transfer from the master B 511 to the slave B 520 starts by arbitration of the arbiter B 514. The operation of the arbiter B 514 will be described below.

The progress degree reception unit 633 receives the progress degree (t_short1) and the master identification information (the master B 511) from the progress degree transfer crossbar 522. According to the received master number, the progress degree reception unit 633 sends the received degree of progress to the deadline recalculation unit 631. The deadline recalculation unit 631 determines whether the notified degree of progress is larger than zero. In this case, since t_short1 is equal to or larger than zero, the deadline recalculation unit 631 stores the degree of progress (t_short1 in this case) as "margin" in the margin register 624. The result of the processing to this point is shown in 14B of FIG. 14.

The master B 511 transfers data to the slave B 520 next so as to finish the data transfer by the deadline t2. The arbiter B 514 arbitrates the data transfer to the slave B 520. Assume that since data transfer from another master to the slave B 520 interferes with the data transfer from the master B 511 to the slave B 520, the data transfer of the master B 511 is not completed within the deadline t2 set in the deadline setting register 605, and is complete at t_end2.

The operation after that is the same as that described in the first operation example. That is, the data transfer from the master B 511 to the slave B 520 results in the progress degree of "margin−t_over2 (>0)". Since the next arbiter register 622, of the deadline scheduling arbiter C 515, which corresponds to the slave C 521 has no next arbiter, the value of the deadline setting register 605 of the arbiter C 515 is updated with "t3'=t3+(margin−t_over2)". The result of the processing to this point is shown in 14C of FIG. 14.

Finally, the master B 511 transfers data to the slave C 521. The arbiter C 515 arbitrates the data transfer to the slave C 521. The data transfer to the slave C 521 ends by the deadline t3' set in the deadline setting register 605 of the arbiter C 515. The result of the processing so far is shown in 14D of FIG. 14.

As described above, according to the fourth embodiment, after given data transfer from a given master to a given slave is completed, the deadline for data transfer succeeding the given data transfer is recalculated using a progress degree held in a bus arbitration apparatus which has arbitrated the given data transfer. With this operation, it is possible to meet the deadline for the sequence of data transfer operations. It is also possible to avoid the sequence of data transfer operations from being processed preferentially more than necessary. That is, it is possible to prevent excessively preferential arbitration by checking the degree of progress of the sequence of data transfer operations, and changing deadlines for data transfer operations. The possibility that transfer from another master is interfered with and the deadline of this other master cannot be met decreases.

Although the present invention has been described using the embodiments, it is not limited to them. The present invention is also applicable to a case in which the sequence of data transfer operations is performed in a plurality of masters, for example, by providing a register such as a next arbiter register to hold a master identifier of a master which performs the next data transfer. Even if the sequence of data transfer operations is arbitrated only in one deadline scheduling arbiter, it is possible to meet the deadline by communicating the degree of progress within the deadline scheduling arbiter. Although the degree of progress is transmitted only to a deadline scheduling arbiter which arbitrates data transfer performed immediately after the preceding data transfer in this embodiment, the present invention is not limited to this. The progress degree transmission unit 626 may distribute, in accordance with a preset ratio, the degree of progress to deadline scheduling arbiters which arbitrate the succeeding data transfer. In this way, the present invention is not limited to the embodiments and various changes can be made without departing from the spirit and scope of the invention. Therefore, to apprise the public of the scope of the present invention, the following claims are made.

This application claims the benefit of Japanese Patent Application No. 2006-166630, filed Jun. 15, 2006, which is hereby incorporated by reference herein in its entirety.

The invention claimed is:

1. A bus arbitration apparatus which arbitrates a contention of data transfer to a slave requested by a plurality of masters in a bus system in which the plurality of masters and the slave are connected, comprising:
   a reception unit configured to receive data transfer requests to the slave from the plurality of masters; and
   an arbitration unit configured to cooperate with another bus arbitration apparatus which arbitrates a contention of data transfer on a second bus requested by the plurality of masters, and to arbitrate the contention of the data transfer on a first bus requested by the plurality of masters,
   wherein the arbitration unit includes a detection unit configured to detect a data transfer waiting state in the other bus arbitration apparatus, and arbitrates the contention of the data transfer to the slave requested by the plurality of masters in accordance with the data transfer waiting state in the other bus arbitration apparatus.

2. The apparatus according to claim 1, wherein the detection unit is configured to detect a data transfer waiting state of each master in the other bus arbitration apparatus, and the arbitration unit arbitrates the contention of the data transfer requested by the plurality of masters in accordance with the data transfer waiting state of each master in the other bus arbitration apparatus.

3. The apparatus according to claim 1, wherein the arbitration unit cooperates with the other arbitration apparatus which arbitrates the contention of data transfer on the second bus requested by the plurality of masters, and in accordance with a deadline of the data transfer on the first bus requested by one of the plurality of masters, arbitrates a contention of data transfer to the slave requested by the one of the plurality of masters and a contention of data transfer to the slave requested by another one of the plurality of masters.

4. A bus arbitration apparatus which arbitrates a contention of data transfer to a slave requested by a plurality of masters in a bus system in which the plurality of masters and the slave are connected, comprising:

a reception unit configured to receive data transfer requests to the slave from the plurality of masters; and an arbitration unit configured to cooperate with another bus arbitration apparatus which arbitrates a contention of data transfer on a second bus requested by the plurality of masters, and to arbitrate the contention of the data transfer on a first bus requested by the plurality of masters, wherein the arbitration unit arbitrates the contention of data transfer in accordance with an in-order transfer requested by one of the plurality of masters.

5. A bus arbitration method which causes a bus arbitration apparatus corresponding to a slave to arbitrate a contention of data transfer requested to the slave by a plurality of masters in a bus system in which the plurality of masters and the slave are connected, comprising:

receiving data transfer requests to the slave from the plurality of masters; and cooperating with another arbitration apparatus which arbitrates a contention of data transfer on a second bus requested by the plurality of masters, and arbitrating the contention of the data transfer on a first bus requested by the plurality of masters, wherein the bus arbitration apparatus detects a data transfer waiting state in the other bus arbitration apparatus, and in accordance with the data transfer waiting state in the other bus arbitration apparatus, arbitrates the contention of the data transfer to the slave requested by the plurality of masters.

6. The method according to claim 5, wherein the bus arbitration apparatus detects a data transfer waiting state of each master in the other bus arbitration apparatus, and in accordance with the data transfer waiting state of each master in the other bus arbitration apparatus, arbitrates the contention of the data transfer requested by the plurality of masters.

7. The method according to claim 5, wherein the bus arbitration apparatus cooperates with the other arbitration apparatus which arbitrates the contention of data transfer on the second bus requested by the plurality of masters, and in accordance with a deadline of the data transfer on a first bus requested by one of the plurality of masters, arbitrates a contention of the data transfer to the slave requested by the one of the plurality of masters and a contention of data transfer to the slave requested by another one of the plurality of masters.

8. A bus arbitration method which causes a bus arbitration apparatus corresponding to a slave to arbitrate a contention of data transfer requested to the slave by a plurality of masters in a bus system in which the plurality of masters and the slave are connected, comprising:

receiving data transfer requests to the slave from the plurality of masters; and cooperating with another arbitration apparatus which arbitrates a contention of data transfer on a second bus requested by the plurality of masters, and arbitrating the contention of the data transfer on a first bus requested by the plurality of masters, wherein the bus arbitration apparatus cooperates with the other bus arbitration apparatus which arbitrates the contention of data transfer in accordance with an in-order transfer requested by the one of the plurality of masters.

* * * * *